US012707405B2

(12) United States Patent
Liu et al.

(10) Patent No.: US 12,707,405 B2
(45) Date of Patent: Aug. 11, 2026

(54) COMMUNICATION METHOD AND APPARATUS

(71) Applicant: Huawei Technologies Co., Ltd., Shenzhen (CN)

(72) Inventors: Fengwei Liu, Chengdu (CN); Kuandong Gao, Chengdu (CN); Shitong Yuan, Chengdu (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 567 days.

(21) Appl. No.: 17/517,385

(22) Filed: Nov. 2, 2021

(65) Prior Publication Data

US 2022/0061006 A1 Feb. 24, 2022

Related U.S. Application Data

(63) Continuation of application No. PCT/CN2020/075799, filed on Feb. 19, 2020.

(30) Foreign Application Priority Data

May 3, 2019 (CN) ........................ 201910376533.2

(51) Int. Cl.
*H04W 56/00* (2009.01)
*H04W 72/0446* (2023.01)
(Continued)

(52) U.S. Cl.
CPC ..... *H04W 56/001* (2013.01); *H04W 72/0446* (2013.01); *H04W 72/0453* (2013.01);
(Continued)

(58) Field of Classification Search
CPC .................................................. H04W 56/001
See application file for complete search history.

(56) References Cited

U.S. PATENT DOCUMENTS

2018/0192383 A1 7/2018 Nam et al.
2019/0132096 A1 5/2019 Abedini et al.
(Continued)

FOREIGN PATENT DOCUMENTS

CN 108401533 A 8/2018
CN 108882376 A 11/2018
(Continued)

OTHER PUBLICATIONS

"Updated IAB resource management framework," 3GPP TSG RAN WG1 Meeting #96bis, Xi'an, China, R1-1905006, Total 8 pages, 3rd Generation Partnership Project, Valbonne, France (Apr. 8-12, 2019).

(Continued)

*Primary Examiner* — Abdeltif Ajid
(74) *Attorney, Agent, or Firm* — Leydig, Voit & Mayer, Ltd.

(57) ABSTRACT

A communication method and an apparatus are provided. The method includes: receiving configuration information from a first node or a third node, where the configuration information indicates time-frequency information of a system information block 1 (SIB1) of a distributed unit (DU) of the first node; and determining, based on the obtained time-frequency information of the SIB1 of the DU of the first node, an unavailable resource of a mobile termination (MT) function of the first node, where the first node is an integrated access and backhaul (IAB) node, the second node is a parent node of the first node, and the third node is a donor node. The method facilitates avoiding a resource conflict between the MT function and the DU of the IAB node.

17 Claims, 6 Drawing Sheets

(51) Int. Cl.
*H04W 72/0453* (2023.01)
*H04W 72/23* (2023.01)
*H04W 88/14* (2009.01)
*H04W 92/24* (2009.01)

(52) U.S. Cl.
CPC .......... *H04W 72/23* (2023.01); *H04W 88/14* (2013.01); *H04W 92/24* (2013.01)

(56) References Cited

U.S. PATENT DOCUMENTS

| | | | | |
|---|---|---|---|---|
| 2019/0289530 | A1* | 9/2019 | Ko | H04L 5/001 |
| 2020/0245324 | A1* | 7/2020 | Kim | H04L 25/0226 |
| 2021/0360550 | A1* | 11/2021 | Ying | H04W 24/10 |
| 2021/0360619 | A1* | 11/2021 | Liu | H04W 72/0453 |
| 2021/0367660 | A1* | 11/2021 | Jo | H04W 72/53 |
| 2022/0104104 | A1* | 3/2022 | Harada | H04W 48/02 |
| 2022/0167331 | A1* | 5/2022 | Huang | H04W 28/16 |

FOREIGN PATENT DOCUMENTS

| | | | |
|---|---|---|---|
| CN | 109246796 | A | 1/2019 |
| CN | 109314912 | A | 2/2019 |
| CN | 109451585 | A | 3/2019 |
| JP | 2012524433 | A | 10/2012 |
| WO | 2018128427 | A1 | 7/2018 |

OTHER PUBLICATIONS

"3rd Generation Partnership Project; Technical Specification Group Radio Access Network; NR; Physical channels and modulation (Release 15)," 3GPP TS 38.211 V15.5.0, pp. 1-96, 3rd Generation Partnership Project, Valbonne, France (Mar. 2019).

"Discussions on resource multiplexing among backhaul and access links," 3GPP TSG RAN WG1 #96bis, Xi'an, China, R1-1904205, pp. 1-8, 3rd Generation Partnership Project, Valbonne, France (Apr. 8-12, 2019).

"3rd Generation Partnership Project; Technical Specification Group Radio Access Network; NR; Physical layer procedures for control (Release 15)," 3GPP TS 38.213 V15.5.0, pp. 1-104, 3rd Generation Partnership Project, Valbonne, France (Mar. 2019).

"3rd Generation Partnership Project; Technical Specification Group Radio Access Network; NR; Radio Resource Control (RRC) protocol specification (Release 15)," 3GPP TS 38.331 V15.5.1, pp. 1-491, 3rd Generation Partnership Project, Valbonne, France (Apr. 2019).

"3rd Generation Partnership Project; Technical Specification Group Radio Access Network; NG-RAN; F1 application protocol (F1AP) (Release 15)," 3GPP TS 38.473 V15.5.0, pp. 1-198, 3rd Generation Partnership Project, Valbonne, France (Mar. 2019).

"Resource multiplexing between backhaul and access in IAB," 3GPP TSG RAN WG1 Meeting #96bis, Xi'an, China, R1-1903938, Total 12 pages, 3rd Generation Partnership Project, Valbonne, France (Apr. 8-12, 2019).

"Summary of 7.2.3.3 Mechanisms for resource multiplexing among backhaul and access links," 3GPP TSG RAN WG1 Meeting #96bis, Xi'an, China, R1-1905739, Total 14 pages, 3rd Generation Partnership Project, Valbonne, France (Apr. 8-12, 2019).

"IAB Resource Management Framework," 3GPP TSG RAN WG1 Meeting #96, Athens, Greece, R1-1902992, Total 8 pages, 3rd Generation Partnership Project, Valbonne, France (Feb. 25-Mar. 1, 2019).

"Initial access procedure for IAB," 3GPP TSG RAN WG1 Ad-Hoc Meeting 1901, Taipei, R1-1900031, Total 4 pages, 3rd Generation Partnership Project, Valbonne, France (Jan. 21-25, 2019).

"SSBs for Inter-IAB Node Discovery and Measurements," 3GPP TSG RAN WG1 #96, Athens, Greece, R1-1902477, pp. 1-3, 3rd Generation Partnership Project, Valbonne, France (Feb. 25-Mar. 1, 2019).

"Resource multiplexing between backhaul and access in IAB," 3GPP TSG RAN WG1 Meeting #99, Reno, USA, R1-1911856, Total 7 pages, 3rd Generation Partnership Project, Valbonne, France (Nov. 18-22, 2019).

"Support of SSBs for IAB Node Discovery and Measurement," 3GPP TSG RAN WG1 #96b, Xi'an, China, R1-1904415, Total 8 pages, 3rd Generation Partnership Project, Valbonne, France (Apr. 8-12, 2019).

"Discussions on resource multiplexing among backhaul and access links," 3GPP TSG RAN WG1 #96bis, Xi'an, China, R1-1905210, Total 11 pages, 3rd Generation Partnership Project, Valbonne, France (Apr. 8-12, 2019).

Huawei, "Overview of RAN1 impacts" 3GPP TSG-RAN WG2#105bis, Xi'an, China, R2-1905033, Revision of R2-1901582, total 5 pages, 3rd Generation Partnership Project, Valbonne, France (Apr. 8-12, 2019).

* cited by examiner

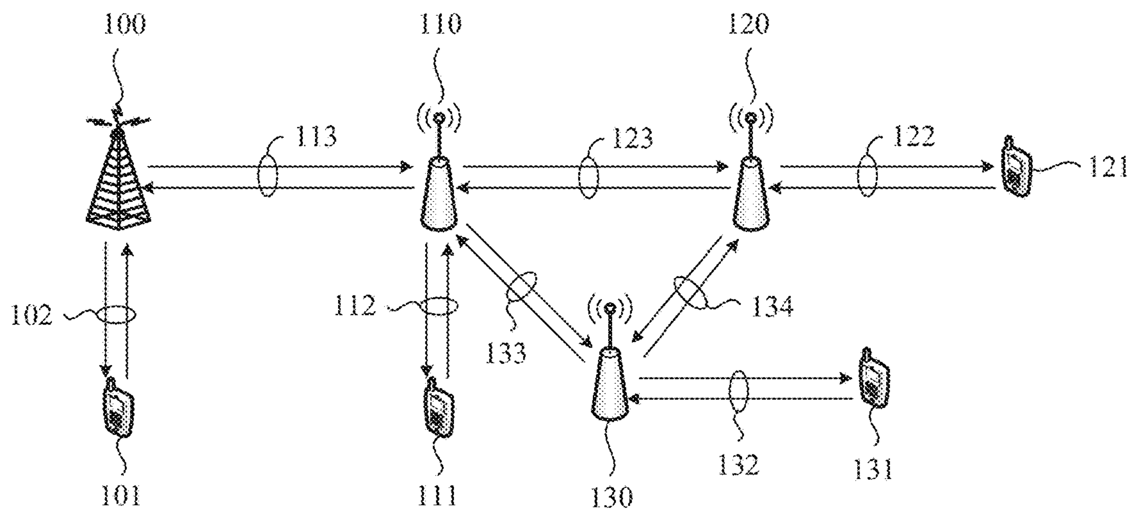
FIG. 1
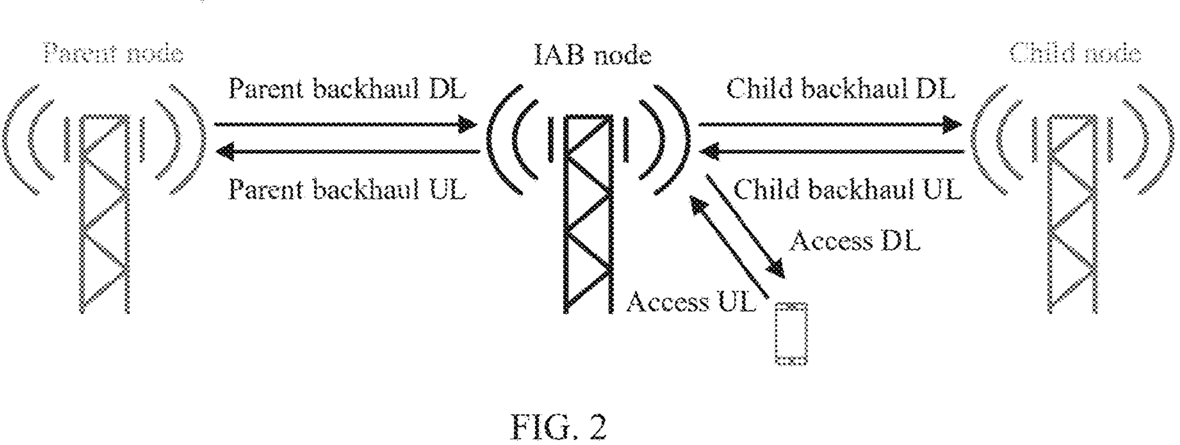
FIG. 2
| Slot number | 0 | 1 | 2 | 3 | 4 | 5 | 6 | 7 | 8 | 9 |
|---|---|---|---|---|---|---|---|---|---|---|
| DU of a parent node | D | D | D | D | F | F | F | F | U | U |
| MT of an IAB node | DCI | D | D | D | F | F | F | F | U | U |
| DU of the IAB node | Null | D-H | D-S | D-S | F-S | F-S | F-H | F-H | U-H | U-S |
| MT of a child node | D | D | D | D | F | F | F | F | U | U |
FIG. 3

COMMUNICATION METHOD AND APPARATUS

CROSS-REFERENCE TO RELATED APPLICATIONS

This application is a continuation of International Application No. PCT/CN2020/075799, filed on Feb. 19, 2020, which claims priority to Chinese Patent Application No. 201910376533.2, filed on May 3, 2019. The disclosures of the aforementioned applications are hereby incorporated by reference in their entireties.

TECHNICAL FIELD

Embodiments of the present invention relate to the communications technologies, and in particular, to a communication method and an apparatus in a wireless communications system.

BACKGROUND

With continuous development of mobile communications technologies, frequency spectrum resources become increasingly insufficient. To improve frequency spectrum utilization, base stations are to be deployed more densely in the future. In addition, dense deployment can further avoid coverage holes. In a conventional cellular network architecture, a base station establishes a connection to a core network by using an optical fiber. However, costs of deployment of optical fibers are very high. A wireless relay node (RN) establishes a connection to a core network through a wireless backhaul link, so that a part of the costs of deployment of optical fibers can be reduced.

Usually, the wireless relay node establishes a wireless backhaul link to one or more parent nodes, and accesses the core network through the parent node. The wireless relay node may provide services for a plurality of child nodes. The parent node of the relay node may be a base station or another relay node. The child node of the relay node may be a terminal device or another wireless relay node.

In-band relay is a relay solution in which a backhaul link and an access link share a same frequency band. Because there is no additional frequency spectrum resource, the in-band relay has advantages such as high spectral efficiency and low deployment costs. The in-band relay is usually subject to a half-duplex constraint. Specifically, the relay node cannot send a downlink signal to the child node of the relay node when receiving a downlink signal sent by the parent node of the relay node, and the relay node cannot send an uplink signal to the parent node of the relay node when receiving an uplink signal sent by the child node of the relay node. A relay solution supported by new radio (NR) of a fifth generation mobile communications (5th generation mobile networks or 5th generation wireless systems, 5G) radio access network (RAN) is referred to as integrated access and backhaul (IAB), and a relay node for integrated access and backhaul is referred to as an IAB node.

The IAB node in NR includes two parts of functions: a mobile termination (MT) function and a distributed unit (DU) function. The MT is used by the IAB node to communicate with a parent node, and the DU is used by the IAB node to communicate with a child node. The parent node may be a common base station (such as a gNB), or may be another IAB node. The child node may be a terminal device, or may be another IAB node.

A link for communication between the MT and the parent node is referred to as a parent backhaul link, a link for communication between the DU and a child IAB node is referred to as a child backhaul link, and a link for communication between the DU and a subordinate terminal device is referred to as an access link. In some cases, the child backhaul link and the access link may be collectively referred to as an access link.

When an IAB node operates normally, resource multiplexing is performed on an access link and a backhaul link in a time division manner, a space division manner, or a frequency division manner. Using time division multiplexing as an example, signal receiving and sending are performed on the backhaul link and the access link at different moments. To ensure normal work of the access link, the IAB node needs to frequently receive and send some cell-level signals or channels, for example, a synchronization signal/physical broadcast channel (SS/PBCH) block and system information (SI).

Currently, in a process of formulating a new radio (NR) standard, the following problem is proposed: How to avoid a conflict between cell-level signal sending and receiving of a DU of an IAB node and transmission of an MT of the IAB node.

To avoid a resource conflict, a parent node needs to learn of a time domain resource for sending a cell-level signal by the DU of the IAB node. Therefore, how the parent node obtains the time domain resource for sending the cell-level signal by the DU of the IAB node is a problem needing to be urgently resolved currently.

SUMMARY

Embodiments of this application provide a communication method and an apparatus, so that a parent node can learn of a time domain resource for sending a signal by a DU of an IAB node, thereby avoiding a transmission conflict with an MT of the IAB node.

To achieve the foregoing objective, the following technical solutions are used in the embodiments of this application.

According to a first aspect, an embodiment of this application provides a communication method, including: receiving configuration information from a first node or a third node, where the configuration information indicates time-frequency information of a system information block 1 SIB1 of a distributed unit DU of the first node; and determining, based on the obtained time-frequency information of the SIB1 of the DU of the first node, an unavailable resource of a mobile termination MT function of the first node, where the first node is an integrated access and backhaul IAB node, the second node is a parent node of the first node, and the third node is a donor node.

The second node determines a hard resource of the DU of the IAB node, and correspondingly determines the hard resource as the unavailable resource of the MT of the IAB node. In this way, the MT of the IAB is prevented from being scheduled on the hard resource, and a resource conflict is avoided.

In a possible implementation, the configuration information specifically includes: time domain information of a synchronization signal/physical broadcast channel SS/PBCH block. The time domain information of the SIB1 is obtained by using the time domain information of the SS/PBCH block, and no additional signaling indication is required, so that signaling overheads can be reduced.

In another possible implementation, the time domain information of the synchronization signal/physical broadcast channel SS/PBCH block includes a periodicity and an offset of the SS/PBCH block.

In a possible implementation, the configuration information further includes a CORESET configuration and search space occupied by a PDCCH of the SIB1, and the CORESET configuration includes one or more of the following information:

information about a multiplexing pattern between the SS/PBCH block and the SIB1, frequency domain information of the SIB1, and a frequency domain offset of the SIB1.

In another possible implementation, the second node stores one or more tables, and each of the one or more tables records the following information:

an index, a multiplexing pattern between the SS/PBCH block and the SIB1, frequency domain information of the SIB1, and a frequency domain offset of the SIB1.

In another possible implementation, the configuration information further includes: a subcarrier spacing of the SS/PBCH block and a subcarrier spacing of the SIB1.

In another possible implementation, the configuration information further includes a minimum channel bandwidth occupied by the DU of the first node.

In another possible implementation, the method further includes:

determining a first table in the one or more tables based on the subcarrier spacing of the SIB1 and the subcarrier spacing of the SS/PBCH block;

receiving, by the second node, a first index, where the first index indicates a CORESET configuration occupied by a PDCCH of the SIB1; and determining, in the first table based on the first index, the CORESET configuration occupied by the PDCCH of the SIB1.

In another possible implementation, the configuration information further includes information indicating a periodicity of the SIB1 and information indicating an offset of the SIB1.

In another possible implementation, the information indicating the periodicity of the SIB1 is a multiple of the periodicity of the SS/PBCH block.

In another possible implementation, the configuration information further includes a slot occupied by the PDCCH of the SIB1 of the DU of the first node.

In another possible implementation, the determining, based on the obtained time-frequency information of the SIB1 of the DU of the first node, an unavailable resource of a mobile termination MT function of the first node specifically includes: determining a time-frequency resource occupied by the SIB1 of the DU of the first node as the unavailable resource of the MT function of the first node.

In another possible implementation, the configuration information is received by using radio resource control RRC signaling or an interface message F1-AP.

In another possible implementation, the method further includes: receiving, by the second node, a time domain parameter of a physical downlink shared channel PDSCH for scheduling the SIB1 by the DU of the first node.

In another possible implementation, the time domain parameter includes time domain resource assignment time domain resource assignment in downlink control information.

According to a second aspect, a communication method is further provided, including: determining, by a first node, time-frequency information of a system information block 1 SIB1 of a distributed unit DU of an IAB node; and sending configuration information to a second node, where the configuration information indicates the time-frequency information of the SIB1, the first node is the integrated access and backhaul IAB node or a donor node, and the second node is a parent node of the first node.

In a possible implementation, the configuration information specifically includes: time domain information of a synchronization signal/physical broadcast channel SS/PBCH block.

In another possible implementation, the time domain information of the synchronization signal/physical broadcast channel SS/PBCH block includes a periodicity and an offset of the SS/PBCH block.

In another possible implementation, the configuration information further includes a CORESET configuration and search space occupied by a PDCCH of the SIB1, and the CORESET configuration includes one or more of the following information:

information about a multiplexing pattern between the SS/PBCH block and the SIB1, frequency domain information of the SIB1, and a frequency domain offset of the SIB1.

In another possible implementation, the configuration information further includes: a subcarrier spacing of the SS/PBCH block and a subcarrier spacing of the SIB1.

In another possible implementation, the configuration information further includes a minimum channel bandwidth occupied by the DU of the first node.

In another possible implementation, the configuration information further includes information indicating a periodicity of the SIB1 and information indicating an offset of the SIB1.

In another possible implementation, the information indicating the periodicity of the SIB1 is a multiple of the periodicity of the SS/PBCH block.

In another possible implementation, the configuration information further includes a slot occupied by the PDCCH of the SIB1 of the DU of the first node.

In another possible implementation, the second configuration information includes: the configuration information is sent by using radio resource control RRC signaling or an interface message F1-AP.

In another possible implementation, the second configuration information further includes: the method further includes: reporting, by the first node to the second node, a time domain parameter of a physical downlink shared channel PDSCH for scheduling the SIB1 by the DU.

In another possible implementation, the time domain parameter includes time domain resource assignment time domain resource assignment in downlink control information.

The parent node of the IAB node obtains a time domain resource of the SIB1 of the DU of the IAB node, and considers the time domain resource as a hard resource of the DU of the IAB node. Correspondingly, an MT of the IAB node cannot use the time domain resource to perform receiving and sending, so that a conflict can be avoided.

According to a third aspect, a node is provided, including: a transceiver unit, configured to receive configuration information from a first node or a third node, where the configuration information indicates time-frequency information of a system information block 1 SIB1 of a distributed unit DU of the first node; and a processing unit, configured to determine, based on the obtained time-frequency information of the SIB1 of the DU of the first node, an unavailable resource of a mobile termination MT function of the first node, where the first node is an integrated access and backhaul IAB node, and the third node is a donor node.

In a possible implementation, the configuration information specifically includes: time domain information of a synchronization signal/physical broadcast channel SS/PBCH block.

In another possible implementation, the time domain information of the synchronization signal/physical broadcast channel SS/PBCH block includes a periodicity and an offset of the SS/PBCH block.

In another possible implementation, the configuration information further includes a CORESET configuration and search space occupied by a PDCCH of the SIB1, and the CORESET configuration includes one or more of the following information:

information about a multiplexing pattern between the SS/PBCH block and the SIB1, frequency domain information of the SIB1, and a frequency domain offset of the SIB1.

In another possible implementation, the configuration information further includes: a subcarrier spacing of the SS/PBCH block and a subcarrier spacing of the SIB1.

In another possible implementation, the configuration information further includes a minimum channel bandwidth occupied by the DU of the first node.

In another possible implementation, the node further includes a storage unit, configured to store one or more tables, where each of the one or more tables records the following information:

an index, a multiplexing pattern between the SS/PBCH block and the SIB1, frequency domain information of the SIB1, and a frequency domain offset of the SIB1.

In another possible implementation, the transceiver unit is further configured to: obtain a subcarrier spacing of the SIB1 and a subcarrier spacing of the SS/PBCH block, and receive a first index, where the first index indicates a CORESET configuration occupied by a PDCCH of the SIB1; and the processing unit is further configured to: determine a first table in the one or more tables based on the subcarrier spacing of the SIB1 and the subcarrier spacing of the SS/PBCH block; and determine, in the first table based on the first index, the CORESET configuration occupied by the PDCCH of the SIB1.

In another possible implementation, the configuration information further includes information indicating a periodicity of the SIB1 and information indicating an offset of the SIB1.

In another possible implementation, the information indicating the periodicity of the SIB1 is a multiple of the periodicity of the SS/PBCH block.

In another possible implementation, the configuration information further includes a slot occupied by the PDCCH of the SIB1 of the DU of the first node.

In another possible implementation, the processing unit is configured to determine a time-frequency resource occupied by the SIB1 of the DU of the first node as the unavailable resource of the MT function of the first node.

In another possible implementation, the transceiver unit is configured to receive the configuration information by using radio resource control RRC signaling or an interface message F1-AP.

In another possible implementation, the transceiver unit is further configured to receive a time domain parameter of a physical downlink shared channel PDSCH for scheduling the SIB1 by the DU of the first node.

In another possible implementation, the time domain parameter includes time domain resource assignment time domain resource assignment in downlink control information.

A parent node of the IAB node obtains a time domain resource of the SIB1 of the DU of the IAB node, and considers the time domain resource as a hard resource of the DU of the IAB node. Correspondingly, the MT of the IAB node cannot use the time domain resource to perform receiving and sending, so that a conflict can be avoided.

According to a fourth aspect, a first node is further provided, including: a processing unit, configured to determine time-frequency information of a system information block 1 SIB1 of a distributed unit DU of an IAB node; and a transceiver unit, configured to report configuration information to a second node, where the configuration information indicates the time-frequency information of the SIB1, the first node is the integrated access and backhaul IAB node or a donor node, and the second node is a parent node of the first node.

In a possible implementation, the configuration information specifically includes: time domain information of a synchronization signal/physical broadcast channel SS/PBCH block.

In another possible implementation, the time domain information of the synchronization signal/physical broadcast channel SS/PBCH block includes a periodicity and an offset of the SS/PBCH block.

In another possible implementation, the configuration information further includes a CORESET configuration and search space occupied by a PDCCH of the SIB1, and the CORESET configuration includes one or more of the following information:

information about a multiplexing pattern between the SS/PBCH block and the SIB1, frequency domain information of the SIB1, and a frequency domain offset of the SIB1.

In another possible implementation, the configuration information further includes: a subcarrier spacing of the SS/PBCH block and a subcarrier spacing of the SIB1.

In another possible implementation, the configuration information further includes a minimum channel bandwidth occupied by the DU of the first node.

In another possible implementation, the configuration information further includes information indicating a periodicity of the SIB1 and information indicating an offset of the SIB1.

In another possible implementation, the information indicating the periodicity of the SIB1 is a multiple of the periodicity of the SS/PBCH block.

In another possible implementation, the configuration information further includes a slot occupied by the PDCCH of the SIB1 of the DU of the first node.

In another possible implementation, the transceiver unit is configured to send the configuration information by using radio resource control RRC signaling or an interface message F1-AP.

In another possible implementation, the transceiver unit is further configured to report, to the second node, a time domain parameter of a physical downlink shared channel PDSCH for scheduling the SIB1 by the DU.

In another possible implementation, the time domain parameter includes time domain resource assignment time domain resource assignment in downlink control information.

According to still another aspect of this application, an apparatus is provided. The apparatus is configured to implement a function of the communication method according to any possible implementation of the first aspect. The function may be implemented by hardware, or may be implemented by hardware by executing corresponding software. The hardware or the software includes one or more units corresponding to the foregoing function.

In a possible implementation, a structure of the apparatus includes a processor, and the processor is configured to support the user equipment in performing the communication method according to any one of the first aspect or the possible implementations of the first aspect. Optionally, the apparatus may further include a memory and a communications interface. The memory stores code and data, the memory is coupled to the processor, and the communications interface is coupled to the processor or the memory.

According to still another aspect of this application, an apparatus is provided. The apparatus is configured to implement a function of the communication method according to any one of the second aspect or the possible implementations of the second aspect. The function may be implemented by hardware, or may be implemented by hardware by executing corresponding software. The hardware or the software includes one or more units corresponding to the foregoing function.

In a possible implementation, a structure of the apparatus includes a processor, and the processor is configured to support a network device in performing a function of the communication method according to any one of the second aspect or the possible implementations of the second aspect. Optionally, the network device may further include a memory and a communications interface. The memory stores code required for the processor and/or a baseband processor, the memory is coupled to the processor, and the communications interface is coupled to the memory or the processor.

According to still another aspect of this application, a computer-readable storage medium is provided. The computer-readable storage medium stores instructions. When the instructions are run on a computer, the computer is enabled to perform the communication method according to any one of the first aspect or the possible implementations of the first aspect, or perform the communication method according to any one of the second aspect or the possible implementations of the second aspect.

According to still another aspect of this application, a computer program product including instructions is provided. When the computer program product runs on a computer, the computer is enabled to perform the communication method according to any one of the first aspect or the possible implementations of the first aspect, or perform the communication method according to any one of the second aspect or the possible implementations of the second aspect.

According to still another aspect of this application, a communications system is provided. The communications system includes a first node, a second node, and a third node. The first node is the first node according to the foregoing aspects, and the communications system is configured to support the first node in performing the communication method according to any one of the first aspect or the possible implementations of the first aspect; the second node is the second node according to the foregoing aspects, and the communications system is configured to support the second node in performing the communication method according to any one of the second aspect or the possible implementations of the second aspect; and/or the third node is the third node according to the foregoing aspects, and the communications system is configured to support the third node in performing the communication method according to any one of the first aspect or the possible implementations of the first aspect.

It may be understood that the apparatus, the computer storage medium, or the computer program product of the communication method provided above is configured to perform the corresponding method provided above. Therefore, for beneficial effects that can be achieved by the apparatus, the computer storage medium, or the computer program product, refer to beneficial effects of the corresponding method provided above. Details are not described herein again.

BRIEF DESCRIPTION OF DRAWINGS

FIG. 1 shows an IAB communications system according to an embodiment of this application;

FIG. 2 is a schematic diagram of a backhaul link and an access link according to an embodiment of this application;

FIG. 3 is a schematic diagram of a hard resource and a soft resource according to an embodiment of this application;

DESCRIPTION OF EMBODIMENTS

Figures 4, 5:
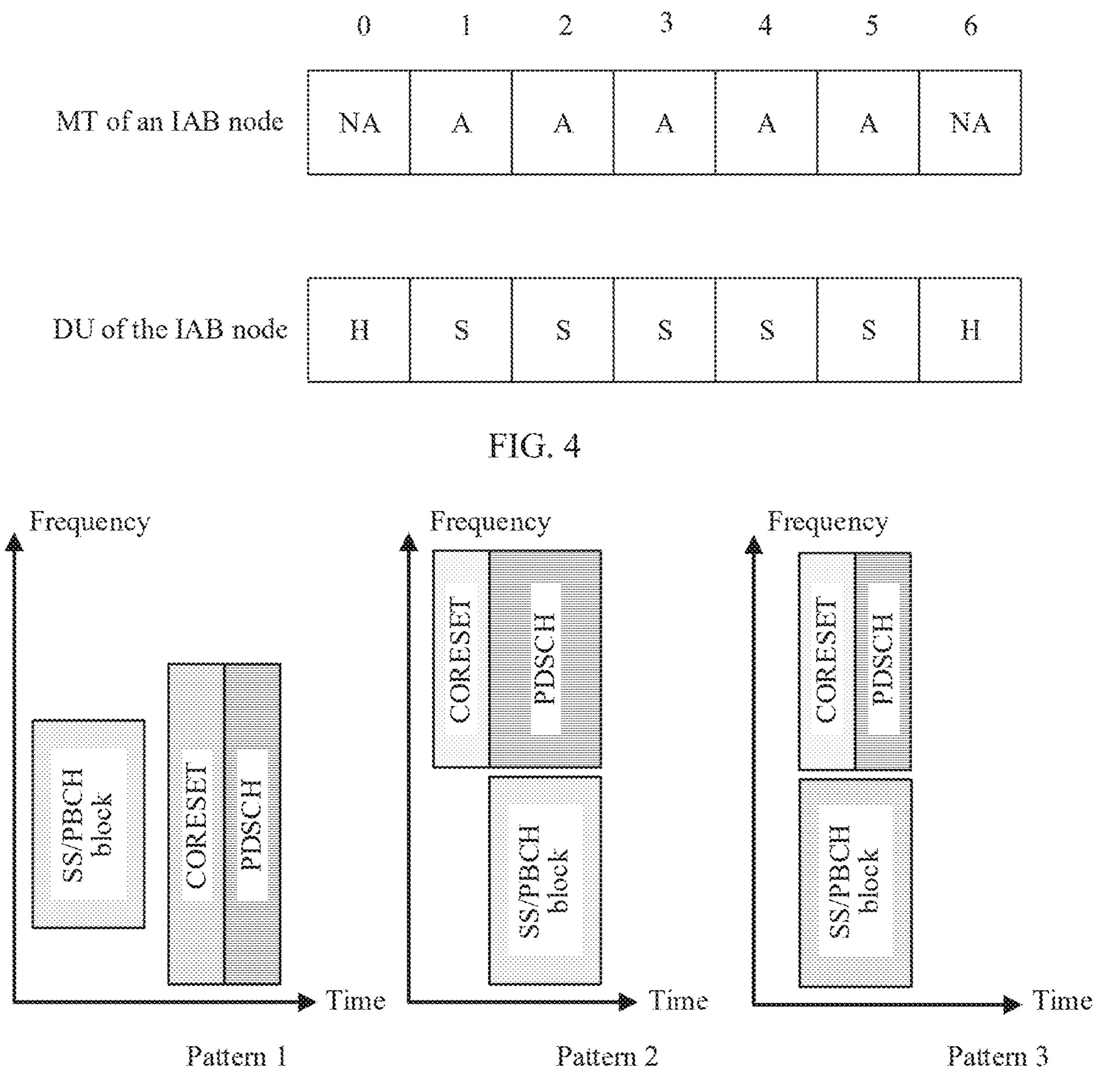
FIG. 4 is a schematic diagram of resource assignment of an MT and a DU of an IAB node according to an embodiment of this application.
FIG. 5 is a multiplexing pattern between an SS/PBCH block and a SIB1 according to an embodiment of this application.

The following describes the technical solutions in embodiments of the present invention with reference to the accompanying drawings in the embodiments of the present invention. It is clear that the described embodiments are merely some but not all of the embodiments of the present invention. All other embodiments obtained by a person skilled in the art based on the embodiments of the present invention without creative efforts shall fall within the protection scope of the present invention.

In the descriptions of this application, "/" means "or" unless otherwise specified. For example, A/B may represent A or B. The term "and/or" in this specification describes only an association relationship for describing associated objects and represents that there may be three relationships. For example, A and/or B may represent the following three cases: Only A exists, both A and B exist, and only B exists. In addition, unless otherwise specified, "a plurality of" in the descriptions of this application means two or more. "Including one or more of A or B" in the embodiments of this application may represent the following three cases: including A, including A and B, and including B. "Including one or more of A, B, or C" in the embodiments of this application may represent the following seven cases: including A, B, and C, including A and B, including A and C, including B and C, including A, including B, and including C.

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as that in a method or an equivalent replacement in this application, and is within the protection scope of this application. Details are not described below.

To better understand a resource determining method and apparatus in a relay system disclosed in the embodiments of the present invention, the following first describes a network architecture used in the embodiments of the present invention. FIG. 1 is a schematic structural diagram of a communications system to which an embodiment of this application is applicable.

It should be noted that the communications system mentioned in the embodiments of this application includes but is not limited to a narrowband internet of things (NB-IoT) system, an internet of vehicles, a wireless local area network (WLAN) system, an LTE system, a 5G mobile communications system, for example, NR or a device to device (D2D) communications system, or a next generation communications system after 5G.

In the communications system shown in FIG. 1, a structure of an integrated access and backhaul IAB system is shown. One IAB system includes at least one base station 100, one or more terminal devices (terminal) 101 served by the base station 100, one or more relay nodes IAB nodes, and one or more terminal devices 111 served by the IAB node 110. Usually, the base station 100 is referred to as a donor base station (donor next generation node B, DgNB), and the IAB node 110 is connected to the base station 100 by using a wireless backhaul link 113. In this application, the donor base station is also referred to as a donor node, namely, a donor node. The base station 100 includes but is not limited to: an evolved NodeB (evolved node base, eNB), a radio network controller (RNC), a NodeB (node B, NB), a base station controller (BSC), a base transceiver station (BTS), a home base station (for example, a home evolved NodeB, or a home node B, HNB), a baseband unit (BBU), an eLTE (evolved LTE) base station, an NR base station (next generation node B, gNB), and the like. The terminal device includes but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a terminal device in a future evolved public land mobile network (PLMN) network, and the like. The IAB node is a specific name of the relay node, and does not constitute a limitation on the solutions of this application. The IAB node may be one of the foregoing base stations or terminal devices that have a forwarding function, or may be in an independent device form.

The integrated access and backhaul system may further include a plurality of other IAB nodes, for example, an IAB node 120 and an IAB node 130. The IAB node 120 is connected to the IAB node 110 by using a wireless backhaul link 123, to access a network. The IAB node 130 is connected to the IAB node 110 by using a wireless backhaul link 133, to access the network. The IAB node 120 serves one or more terminal devices 121. The IAB node 130 serves one or more terminal devices 131. In FIG. 1, both the IAB node 110 and the IAB node 120 are connected to the network by using a wireless backhaul link. In this application, the wireless backhaul link is viewed from a perspective of a relay node. For example, the wireless backhaul link 113 is a backhaul link of the IAB node 110, and the wireless backhaul link 123 is a backhaul link of the IAB node 120.

As shown in FIG. 1, one IAB node such as 120 may be connected to another IAB node 110 by using a wireless backhaul link such as 123, to access the network. In addition, the relay node may be connected to the network by using a plurality of levels of wireless relay nodes. It should be understood that, in this application, the IAB node is used only for a purpose of description, but does not indicate that the solutions of this application are used only in an NR scenario. In this application, the IAB node may be any node or device that has a relay function. It should be understood that use of the IAB node and use of the relay node in this application have a same meaning. For example, the IAB node may be a base station, a transmission reception point TRP, and a module or an apparatus disposed on a moving object, where the moving object includes but is not limited to a device in the internet of things, for example, a car, a train, or an airplane.

Generally, a child node may be considered as a terminal device of a parent node. It should be understood that, in the integrated access and backhaul system shown in FIG. 1, one IAB node is connected to one parent node. However, in a future relay system, to improve reliability of a wireless backhaul link, one IAB node such as 120 may have a plurality of parent nodes providing services for the IAB node at the same time. As shown in the FIGURE, the IAB node 130 may also be connected to the IAB node 120 by using a backhaul link 134, that is, both the IAB node 110 and the IAB node 120 are parent nodes of the IAB node 130. Names of the IAB nodes 110, 120, and 130 do not limit a scenario or a network in which the IAB nodes 110, 120, and 130 are deployed, and there may be any other name such as a relay or an RN. In this application, the IAB node is used only for ease of description.

In FIG. 1, radio links 102, 112, 122, 132, 113, 123, 133, and 134 may be bidirectional links, including uplink and downlink transmission links. Specifically, the wireless backhaul links 113, 123, 133, and 134 each may be used by a parent node to provide a service for a child node. For example, the parent node 100 provides a wireless backhaul service for the child node 110. It should be understood that an uplink and a downlink of the backhaul link may be separated. To be specific, transmission on the uplink and transmission on the downlink are not performed through a same node. Downlink transmission means transmitting information or data from a parent node such as the node 100 to a child node such as the node 110. Uplink transmission means transmitting information or data from a child node such as the node 110 to a parent node such as the node 100. The node is not limited to a network node or a terminal device. For example, in a D2D scenario, a terminal device may be used as a relay node to serve another terminal device. In some scenarios, the wireless backhaul link may also be an access link. For example, the backhaul link 123 may also be considered as an access link of the node 110, and the backhaul link 113 is also an access link of the node 100. For the node 110, the link 113 is referred to as a parent backhaul link (parent BH), the link 123 is referred to as a child backhaul link (child BH), and the link 112 is referred to as an access link. It should be understood that the parent node may be a base station or a relay node, and the child node may be a relay node or a terminal device having a relay function. For example, in the D2D scenario, the child node may also be a terminal device.

The relay node shown in FIG. 1, such as 110, 120, or 130, may exist in two forms. One form is that the relay node exists as an independent access node, and may independently manage a terminal device that accesses the relay node. In this case, the relay node usually has an independent physical cell identifier (PCI). A relay in this form usually needs to have all functions of a protocol stack, for example, radio resource control (RRC) functions. Such a relay is usually referred to as a layer 3 relay. A relay node and a donor node in the other form, such as a donor eNB or a donor gNB, belong to a same cell, and a user is managed by a donor base station, for example, the donor node. Such a relay is usually referred to as a layer 2 relay.

The layer 2 relay usually exists as a DU of a base station DgNB in a central unit and distributed unit (CU-DU) architecture in NR, and communicates with a CU through an F1-AP (F1 application protocol) interface or based on a tunneling protocol. The tunneling protocol may be, for example, the GTP (general packet radio service tunneling protocol) protocol, and the F1-AP may be an F1-AP enhanced interface. Details are not described again.

The donor node is a node through which a core network may be accessed, or an anchor base station in a radio access network. A network may be accessed through the anchor base station. The anchor base station is responsible for receiving data of the core network and forwarding the data to the relay node, or receiving data of the relay node and forwarding the data to the core network.

For ease of description, the following explains basic terms or concepts used in this application.

A parent node is a node that provides a wireless backhaul link resource, such as 110, which is referred to as a parent node of the IAB node 120. The parent node may also be referred to as an upstream node. It should be understood that the parent node is not limited to a direct parent node that provides a wireless backhaul link resource, but includes all nodes that provide a wireless backhaul link resource on a link that provides transmission to a donor base station. The direct parent node is a node that directly provides a transmission resource for a relay node. For example, the IAB node 110 is a direct parent node of the IAB node 120.

A child node is a node that transmits data to a network on a backhaul link resource, or receives data from the network. For example, 120 is referred to as a child node of the relay node 110, and the network is a core network or a network above another access network, such as the Internet or a dedicated network. Similarly, the child node is not limited to a direct child node for which a wireless backhaul link resource is provided, but includes all nodes for which a wireless backhaul link resource is provided on a link that provides transmission to a target node. The direct child node is a node for which a transmission resource is directly provided. For example, the IAB node 120 is a direct child node of the IAB node 110.

An access link is a link between UE and an IAB node or between UE and an IAB donor node (IAB Donor). Alternatively, the access link includes a radio link used when a node communicates with a child node of the node. The access link includes an uplink access link and a downlink access link. The uplink access link is also referred to as uplink transmission of the access link, and the downlink access link is also referred to as downlink transmission of the access link.

A backhaul link is a link between an IAB node and an IAB child node or between an IAB node and an IAB parent node. The backhaul link includes a downlink transmission link between an IAB node and an IAB child node or between the IAB node and an IAB parent node. The backhaul link further includes an uplink transmission link between the IAB node and the IAB child node or between the IAB node and the IAB parent node. That the IAB node transmits data to the IAB parent node or receives an uplink transmission from the IAB child node is referred to as uplink transmission on the backhaul link. That the IAB node receives a data transmission from the IAB parent node or transmits data to the IAB child node is referred to as downlink transmission on the backhaul link. To distinguish between UE and the IAB node, the backhaul link between the IAB node and the IAB parent node is also referred to as a parent backhaul link (parent BH), and the backhaul link between the IAB node and the IAB child node is referred to as a child backhaul link (child BH).

In NR, an IAB node includes two main functions: a mobile termination (MT) function and a distributed unit (DU) function. The IAB node may perform uplink transmission and/or downlink transmission with a parent node on an MT. The IAB node may perform uplink transmission and/or downlink transmission with a child node on a DU.

FIG. 2 is a schematic diagram of a parent node and a child node of an IAB node. As shown in FIG. 2, a parent backhaul DL is a link on which the parent node sends a downlink signal to the IAB node. A parent backhaul UL is a link on which the IAB node sends an uplink signal to the parent node. A child backhaul DL is a link on which the IAB node sends a downlink signal to the child node. A child backhaul UL is a link on which the child node sends an uplink signal to the IAB node. An access UL is a link on which a terminal device sends an uplink signal to the IAB node. An access DL is a link on which the IAB node sends a downlink signal to the terminal device.

FIG. 3 is a schematic diagram of resource configuration of an IAB node in NR. In FIG. 3, time division duplex (TDD) is used as an example. MT resources of the IAB node may be configured as three types: downlink (D), uplink (U), and flexible (F). An F-type resource may be configured for uplink transmission or downlink transmission, and whether the F-type resource is specifically used for uplink transmission or downlink transmission depends on a signaling configuration.

DU resources of the IAB node may be configured as four types: downlink, uplink, flexible, and unavailable (Null, N). Further, three types of DU resources: downlink resources, uplink resources, and flexible resources, may be further classified into hard (H) resources and soft(S) resources. A hard resource of a DU indicates a resource that is always available for the DU. A soft resource of the DU indicates that whether the resource is available for the DU depends on an indication of a parent node (for example, a donor node). In FIG. 3, the parent node controls use of the S resource on the DU of the IAB node through downlink control information (DCI) in a downlink slot or subframe. The H resource and the S resource are semi-statically configured by a donor base station or the parent node through RRC, or semi-statically configured by a donor base station based on an F1-AP protocol.

An MT of the IAB node is connected to a DU of the parent node, and the DU of the IAB node is connected to an MT of a child node. After semi-static (for example, through RRC signaling) resource configuration is performed, the IAB node may separately obtain resource configurations of an MT resource and a DU resource of the IAB node. For example, transmission directions (D/U/F) of the MT resource and the DU resource, a type (soft/hard) of the DU resource, a position of a NULL resource of the DU, and the like may be included.

With reference to FIG. 3 and the following Table 1, it can be learned that, for the IAB node, MT resources (for example, MT resources corresponding to slots 1, 6, 7, and 8) corresponding to hard resources (for example, DU resources corresponding to the slots 1, 6, 7, and 8) of the DU of the IAB node are unavailable. It should be understood that a number of a slot in FIG. 3 may also be a number of a subframe or a number of a symbol. The following mainly uses a slot as an example for description, and details are not described again.

Specifically, with reference to the foregoing description, the MT of the IAB node has three types of resources, and the DU of the IAB node has seven types of resources. After every two types of resources are combined, possible sending and receiving statuses of the MT of the IAB node and of the DU corresponding to the MT are shown in the following Table 1 and Table 2. Table 1 shows a resource configuration status in various possible resource type combinations of the MT and the DU in a time division multiplexing scenario. Table 2 shows a resource configuration status in various possible resource type combinations of the MT and the DU in a spatial division multiplexing (SDM) scenario.

TABLE 1

| DU resource | MT resource type | | |
|---|---|---|---|
| type | D | U | F |
| D-H | DU: Tx<br>MT: NULL | DU: Tx<br>MT: NULL | DU: Tx<br>MT: NULL |
| D-S | When a DU resource: IA<br>DU: Tx<br>MT: NULL<br>When a DU resource: INA<br>DU: NULL<br>MT: Rx | When a DU resource: IA<br>DU: Tx<br>MT: NULL<br>When a DU resource: INA<br>DU: NULL<br>MT: Tx | When a DU resource: IA<br>DU: Tx<br>MT: NULL<br>When a DU resource: INA<br>DU: NULL<br>MT: Tx/Rx |
| U-H | DU: Rx<br>MT: NULL | DU: Rx<br>MT: NULL | DU: Rx<br>MT: NULL |
| U-S | When a DU resource: IA<br>DU: Rx<br>MT: NULL<br>When a DU resource: INA<br>DU: NULL<br>MT: Rx | When a DU resource: IA<br>DU: Rx<br>MT: NULL<br>When a DU resource: INA<br>DU: NULL<br>MT: Tx | When a DU resource: IA<br>DU: Rx<br>MT: NULL<br>When a DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When a DU resource: IA<br>DU: Tx/Rx<br>MT: NULL<br>When a DU resource: INA<br>DU: NULL<br>MT: Rx | When a DU resource: IA<br>DU: Tx/Rx<br>MT: NULL<br>When a DU resource: INA<br>DU: NULL<br>MT: Tx | When a DU resource: IA<br>DU: Tx/Rx<br>MT: NULL<br>When a DU resource: INA<br>DU: NULL<br>MT: Tx/Rx |
| NULL | DU: NULL<br>MT: Rx | DU: NULL<br>MT: Tx | DU: NULL<br>MT: Tx/Rx |

TABLE 2

| DU resource | MT resource type | | |
|---|---|---|---|
| type | DL | UL | F |
| DL-H | DU: Tx<br>MT: NULL | DU: Tx<br>MT: Tx | DU: Tx<br>MT: Tx |
| DL-S | When a DU resource: IA<br>DU: Tx<br>MT: NULL<br>When a DU resource: INA<br>DU: NULL<br>MT: Rx | When a DU resource: IA<br>DU: Tx<br>MT: Tx<br>When a DU resource: INA<br>DU: NULL<br>MT: Tx | When a DU resource: IA<br>DU: Tx<br>MT: Tx<br>When a DU resource: INA<br>DU: NULL<br>MT: Tx/Rx |
| UL-H | DU: Rx<br>MT: Rx | DU: Rx<br>MT: NULL | DU: Rx<br>MT: Rx |
| UL-S | When a DU resource: IA<br>DU: Rx<br>MT: Rx<br>When a DU resource: INA<br>DU: NULL<br>MT: Rx | When a DU resource: IA<br>DU: Rx<br>MT: NULL<br>When a DU resource: INA<br>DU: NULL<br>MT: Tx | When a DU resource: IA<br>DU: Rx (only when the IAB-DU learns in advance that the IAB-MT is in an Rx state)<br>MT: Rx<br>When a DU resource: INA<br>DU: NULL<br>MT: Tx/Rx |
| F-H | DU: Tx/Rx<br>MT: Rx (only when the parent node learns in advance that the IAB-DU is in an Rx state) | DU: Tx/Rx<br>MT: Tx (only when the parent node learns in advance that the IAB-DU is in a Tx state) | DU: Tx/Rx<br>MT: Tx (only when the parent node learns in advance that the IAB-DU is in a Tx state), Rx (only when the parent node learns in advance that the IAB-DU is in an Rx state) |
| F-S | When a DU resource: IA<br>DU: Tx/Rx<br>MT: Rx (only when the parent node learns in advance that the IAB-DU is in an Rx state)<br>When a DU resource: INA<br>DU: NULL<br>MT: Rx | When a DU resource: IA<br>DU: Tx/Rx<br>MT: Tx (only when the parent node learns in advance that the IAB-DU is in a Tx state)<br>When a DU resource: INA<br>DU: NULL<br>MT: Tx | When a DU resource: IA<br>DU: Tx/Rx<br>MT: Tx (only when the parent node learns in advance that the IAB-DU is in a Tx state), Rx (only when the parent node learns in advance that the IAB-DU is in an Rx state)<br>When a DU resource: INA<br>DU: NULL<br>MT: Tx/Rx |
| NA | DU: NULL<br>MT: Rx | DU: NULL<br>MT: Tx | DU: NULL<br>MT: Tx/Rx |

In Table 1 and Table 2, Meanings of Identifiers are as Follows:

"MT: Tx" indicates that the MT should perform transmission after being scheduled; "DU: Tx" indicates that the DU may perform transmission;

"MT: Rx" indicates that the MT is capable of performing receiving (if there is a signal that needs to be received);

"DU: Rx" indicates that the DU may schedule uplink transmission of the child node; "MT: Tx/Rx" indicates that the MT should perform transmission or receiving after being scheduled, but the transmission and the receiving are not simultaneously performed;

"DU: Tx/Rx" indicates that the DU may perform transmission or receive a transmission of the child node, but the transmission and the receiving are not simultaneously performed;

"IA" indicates that the DU resource is explicitly or implicitly indicated as available;

"INA" indicates that the DU resource is explicitly or implicitly indicated as unavailable;

"MT: NULL" indicates that the MT does not perform sending and does not need to have a receiving capability; and "DU: NULL" indicates that the DU does not perform sending and does not receive a transmission of the child node.

In this application, a TDM scenario is mainly considered. However, the solutions of this application may also be extended to an SDM scenario, a frequency division multiplexing (FDM) scenario, or a full duplex scenario. In the TDM scenario, an MT resource corresponding to a hard resource of the DU is unavailable.

Specifically, on Unavailable Resources of the MT:

(1) the MT does not expect the parent node to schedule the MT on these resources;

(2) the MT does not receive or send reference signals on these resources; and (3) the MT does not perform physical downlink control channel (PDCCH) monitoring on these resources, that is, if search space overlaps with these resources, the MT of the IAB node abandons monitoring of the overlapping search space.

It should be understood that, in addition to the MT unavailable resource corresponding to the DU hard resource, the MT may further have another unavailable resource.

After the semi-static configuration is completed, the parent node continues to dynamically indicate, for the IAB node through dynamic signaling (for example, downlink control information (DCI)), availability of a soft-type resource of a DU resource of the IAB node. For example, the parent node uses dedicated DCI or a dedicated DCI field to indicate availability of the soft resource of the IAB node. For ease of description, information included in the dynamic signaling is referred to as indication information, and the dedicated DCI or the dedicated DCI field may be collectively referred to as indication DCI.

The foregoing dynamic indication may be implemented in a plurality of manners.

In an implementation, an explicit indication manner may be used.

For example, the parent node directly indicates availability of the soft-type resource of the DU resource of the IAB node, and may further indicate a transmission direction of some types (for example, an F type) of soft resources at the same time.

In another implementation, an implicit indication manner may be used.

For example, the parent node indicates whether an MT resource (for example, an available resource of the MT) of the IAB node is released (or whether the MT resource is available), and the IAB node determines availability of the soft-type resource of the DU resource of the IAB node based on an indication of the parent node for the MT resource.

When the DU of the IAB node is configured as a hard resource, the IAB node usually performs complete transmission in a slot configured as the hard resource. The complete transmission means that the IAB node considers that all symbols in the slot configured as the hard resource are available. In addition, the hard resource of the IAB node may be considered as an always available resource. For a DU hard resource, the IAB node can always communicate with the child node on the resource, regardless of a scheduling configuration status of the MT. In other words, communication between the parent node and the MT of the IAB node should not affect communication between the DU and the child node or UE on the hard resource.

In an implementation, some periodic signals of the DU of the IAB node include but are not limited to a periodic CSI-RS and a periodic SRS, and are configured by the donor node and notified to a terminal device or the child node of the IAB node through RRC signaling. In this case, the periodic signals configured by the donor node for the IAB node should be located on hard resources of the DU of the IAB node.

FIG. 4 is a schematic diagram of a relationship between a hard/soft resource of a DU and an available or unavailable resource of an MT according to an embodiment of this application. In FIG. 4, a symbol is used as an example. H indicates a hard resource, S indicates a soft resource, A indicates an available resource, and NA indicates an unavailable resource. It should be understood that FIG. 4 is merely an example, and 0, 1, 2, 3, 4, 5, and 6 may represent symbols, or may represent slots or subframes.

For example, FIG. 4 shows seven symbols. A symbol 0 and a symbol 6 are hard resources of the DU, and the DU may always use the symbol 0 and the symbol 6. In FIG. 4, assuming that resource assignment is performed between the MT and the DU of an IAB node in a time division multiplexing TDM manner, for the MT, the symbol 0 and the symbol 6 are unavailable resources. Symbols 1 to 5 in the FIGURE are soft symbols of the DU. For the MT, the symbol 1 to the symbol 5 are available resources.

In a current discussion of NR IAB, the following problem is posed: How to avoid a conflict between cell-specific signal or channel sending and receiving of a DU of an IAB node and transmission of an MT function of the IAB node. Specifically, to ensure normal working of an access link, the DU of the IAB node should be capable of receiving or sending a cell-specific signal. When the DU of the IAB node receives or sends a cell-specific signal, a parent node should not schedule the MT function of the IAB node.

To Resolve the Foregoing Conflict, the Following Two Specific Solutions May be Used to Resolve the Conflict:

Solution 1: During resource configuration, all resources for sending cell-specific signals or channels are configured as hard resources.

Solution 2: When a non-hard resource is used for a cell-specific signal or channel, the resource is converted into a hard resource, or the resource is considered as a hard resource.

Because the cell-specific signal may have a relatively large periodicity, flexibility of resource assignment may be severely restricted in the solution 1. Therefore, the solution 2 is a better option.

In the solution 2, to avoid a resource conflict, the parent node needs to learn a time domain resource for sending the cell-specific signal by the DU of the IAB node. Therefore, the problem to be resolved by the present invention is how the parent node obtains the time domain resource for sending the cell-specific signal by the DU of the IAB node.

The Cell-Specific Signal May be One of the Following Signals:

a synchronization signal/physical broadcast channel (SS/PBCH) block (which may also be referred to as an SSB for short), a system information block (SIB), a channel state information reference signal (CSI-RS), a random access channel (RACH), a sounding reference signal (SRS), and a scheduling request (SR).

This embodiment of this application mainly describes how the parent node obtains a time-frequency resource for sending a SIB1 and the SS/PBCH block by the DU of the IAB node. For other cell-specific signals, refer to the solution of this application. After learning of the time-frequency resource of the cell-specific signal of the DU of the IAB node, the parent node considers a resource occupied by the DU as a hard resource of the DU of the IAB node. Correspondingly, the MT of the IAB node does not use the resource for transmission. Alternatively, the IAB node does not expect the parent node to schedule the MT of the IAB node on the resource. Alternatively, transmission of the MT that is scheduled by the parent node and that is of the IAB node does not affect use of the hard resource by the DU.

First, how the parent node obtains a time domain resource of an SS/PBCH block (which may also be represented as an SSB) of the IAB node or a child node is described.

The DU of the IAB node may send two types of SS/PBCH blocks. One type of SS/PBCH block is used for access of a terminal device, and may be referred to as a cell-defining SS/PBCH block or an access SS/PBCH block (AC-SSB). The other type of SS/PBCH block is used for mutual measurement between IAB nodes, and may be referred to as a backhaul SS/PBCH block (BH-SSB). Generally, the two types of SS/PBCH blocks are located in different time domain positions.

For the AC-SSB, the DU of the IAB node sends time-frequency information of the SS/PBCH block to the terminal device or the child node by using an RRC message. The RRC information is usually generated by a donor node. Therefore, the donor node may send time domain information of the AC-SSB to the parent node. Alternatively, the IAB node reports the time-frequency information of the AC-SSB to the parent node, where the time-frequency information includes a periodicity of the SS/PBCH block, an index of the SS/PBCH sent in a half-frame, and/or an offset of the SS/PBCH block relative to a start position, and the like.

Optionally, when the parent node does not obtain the time-frequency information of the AC-SSB of the DU of the IAB node, the parent node may assume that at least some parameters (for example, the periodicity of the SS/PBCH block and the offset) of the SS/PBCH block sent by the DU of the IAB node are the same as those of the parent node. That is, a time-frequency resource of the AC-SSB of the DU of the IAB node is considered to be the same as a periodicity of an SS/PBCH block of the parent node. Alternatively, a time-frequency resource of the AC-SSB of the DU of the IAB node is considered to be the same as a periodicity and an offset of an SS/PBCH block of the parent node.

Optionally, the parent node may assume that the IAB node performs sending on available resources of all SS/PBCH blocks in a half-frame (actually, the IAB node may perform sending only on a part of available time-frequency resources).

For the BH-SSB, the donor node sends a BH-SSB transmission configuration information (SS/PBCH block transmission configuration, STC) to each IAB node. Therefore, the donor node may send the BH-SSB transmission configuration of the IAB node to the parent node of the IAB node, or the IAB node reports the STC of the IAB node to the parent node. The STC includes one or more of the following information: a sending periodicity, an offset, and a subcarrier spacing of the SS/PBCH block, an index of the SS/PBCH block, and frequency domain information of the SS/PBCH block.

In conclusion, a first node or a third node sends time-frequency configuration information of the SS/PBCH block to a second node, where the time-frequency configuration information of the SS/PBCH block includes the sending periodicity and the offset of the SS/PBCH block. The first node is the IAB node, the third node is the donor node, and the second node is the parent node of the IAB node.

The second node learns, based on the time-frequency configuration information of the SS/PBCH block, of the time-frequency resource for sending the SS/PBCH block by a DU of the third node, and further does not send a downlink signal to an MT of the third node on the corresponding time-frequency resource, to avoid a conflict.

Further, the time-frequency configuration information of the SS/PBCH block further includes the subcarrier spacing of the SS/PBCH block, an index of the SS/PBCH block in a half-frame, and the frequency domain information of the SS/PBCH block.

In this embodiment, the second node determines, based on the time-frequency information of the SS/PBCH block of the DU of the IAB node, the time-frequency resource for sending the SIB1 by the DU of the IAB node, and then does not send a downlink signal to an MT function of the third node on the time-frequency resource, to avoid a resource conflict between the MT function and the DU of the IAB node.

It should be noted that sending a BH-SSB by the DU of the IAB node may conflict with receiving an SS/PBCH block by the MT of the IAB node in time domain. To avoid a conflict, two results may occur in this case: sending the BH-SSB by the DU of the IAB node is muted, or receiving the SS/PBCH block by the MT of the IAB node is muted. For example, when sending the BH-SSB by the DU of the IAB node is muted, it indicates that a hard resource of the IAB node is occupied by some specific MT signals.

In a possible implementation, a priority of receiving an SS/PBCH block by the MT of the IAB node is higher than a priority of sending an SS/PBCH block by the DU of the IAB node. Therefore, when a receiving configuration of the SS/PBCH block conflicts with a sending configuration of the SS/PBCH block, that is, when SS/PBCH block receiving configured for the MT of the IAB node and SS/PBCH block sending configured for the DU of the IAB node occupy same time domain resources, the DU of the IAB node does not perform the SS/PBCH block sending. However, the MT of the IAB node may alternatively not perform the SS/PBCH block receiving on these resources. In this case, the IAB node may consider these resources as hard resources of the DU of the IAB node, that is, other signals or channels are transmitted between the IAB node and the child node or the terminal device on these resources.

In another possible implementation, on a resource configured for the MT of the IAB node and used to receive an SS/PBCH block, for example, a resource occupied by an SMTC, the parent node does not expect the MT of the IAB node to transmit another signal. Therefore, when the MT of the IAB node does not receive the SS/PBCH block, the DU of the IAB node can use this resource.

The foregoing describes how the parent node obtains the time domain resource for sending the SS/PBCH block by the DU of the IAB node. The following describes how the parent node obtains the time domain resource of the SIB1. The time-frequency resource, of the SIB1, obtained by the parent node includes two parts. A first part is a time-frequency resource, obtained by the parent node, on which a PDCCH of the SIB1 is monitored by the terminal device. A second part is a time-frequency resource for actually sending the SIB1 by the DU of the IAB node (the time-frequency resource on which the PDCCH of the SIB1 is monitored by the terminal device may also be understood as all time-frequency resources that may be used by the DU of the IAB node to send the SIB1. Actually, the DU of the IAB node may not send the SIB1 on all available time-frequency resources of the SIB1. Therefore, the second part is further required to determine a time domain resource on which the SIB1 is actually sent). There are a plurality of types of SIBs. System information sent on the SIB1 is also referred to as remaining minimum system information (RMSI), and system information sent on a SIB other than the SIB1 is referred to as other system information (OSI). This embodiment of this application mainly describes how the parent node obtains the time-frequency resource of the SIB1.

In NR, the SIB1 and the SS/PBCH block have three multiplexing patterns: a pattern 1, a pattern 2, and a pattern 3, as shown in FIG. 5. In FIG. 5, a SIB1-PDSCH, that is, a physical downlink shared channel (PDSCH) of the SIB1, represents a PDSCH carrying the SIB1, and a CORESET (control resource set) represents a resource occupied by a physical downlink control channel PDCCH for scheduling the SIB1-PDSCH (where the CORESET is sometimes referred to as a SIB1-PDCCH hereinafter, and it should be understood that both meanings expressed by the CORESET and the SIB1-PDCCH are the resource occupied by the PDCCH for scheduling the SIB1-PDSCH).

Pattern 1: Both the PDCCH and PDSCH of the SIB1 are time division multiplexed with the SS/PBCH block.

Pattern 2: The PDCCH of the SIB1 is time division multiplexed with the SS/PBCH block, and the PDSCH of the SIB1 is frequency division multiplexed with the SS/PBCH block.

Pattern 3: Both the PDCCH and PDSCH of the SIB1 are frequency division multiplexed with the SS/PBCH block.

The following uses a specific multiplexing pattern as an example to further describe how to obtain the time-frequency resource of the SIB1 by using the time-frequency resource of the SS/PBCH block. It should be understood that the time-frequency resource of the SIB1 includes the CORESET of the SIB1 and a resource for transmitting the PDSCH of the SIB1. Details are not described below.

(1) The multiplexing pattern between the SS/PBCH block and the SIB1 is the pattern 3.

Figure 6:
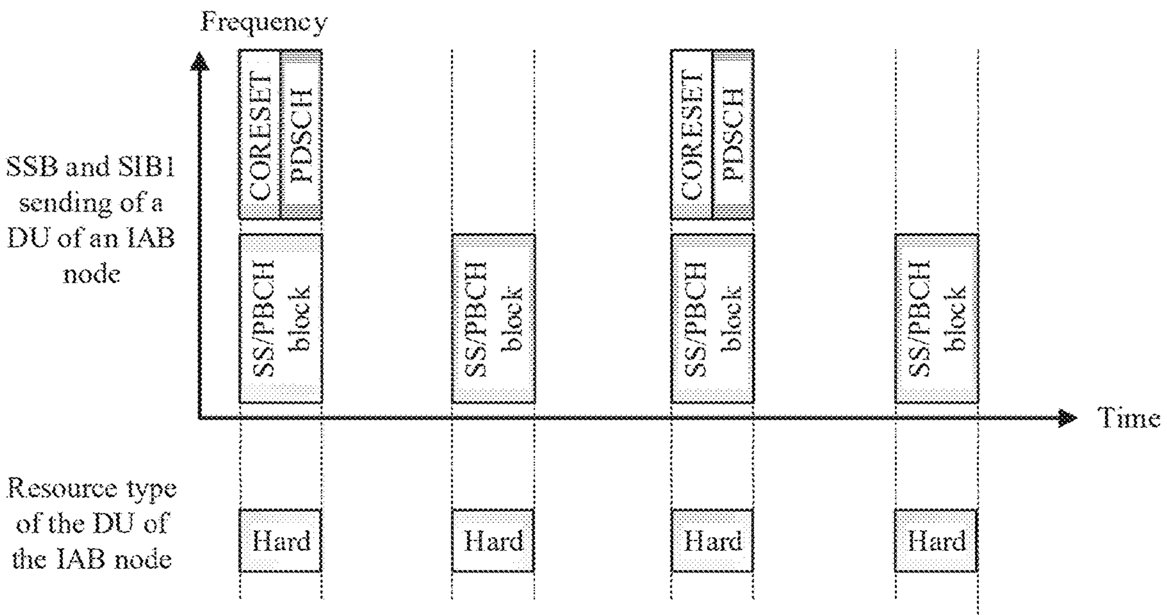
FIG. 6 is a schematic diagram of a pattern 3 according to an embodiment of this application.

As shown in FIG. 6, when a multiplexing pattern between an SS/PBCH block and a SIB1 is the pattern 3, a SIB1-PDCCH and a SIB1-PDSCH are frequency division multiplexed with the SS/PBCH block. Assuming that a parent node learns, by using the solution described above, of a time-frequency resource used by a DU of an IAB node to send an SS/PBCH, the parent node may infer that the DU of the IAB node may send information about a time-frequency resource of the SIB1-PDCCH.

As shown in FIG. 6, it is assumed that a periodicity of sending the SS/PBCH block by the DU of the IAB node is 20 ms (a length of each radio frame is 10 ms, which is equivalent to that the SS/PBCH block is sent once every other radio frame), and a start position is a radio frame 0. In this case, time domain resources on which the SS/PBCH block is sent are the radio frame 0, a radio frame 2, a radio frame 4, and the like. However, in NR, an SS/PBCH block is usually sent by using a slot or a symbol as a granularity. One radio frame includes 10 subframes. For different waveform parameters (Numerology), symbol positions of the SS/PBCH block in a slot are as follows:

For a subcarrier spacing of 15 kHz, the SS/PBCH block is sent according to {2, 8}+14*n, where {2, 8} indicates an index, namely, a position, of the first symbol of the SS/PBCH block. The rest can be deduced by analogy, and details are not described again. For a frequency band less than or equal to 3 GHZ, n=0 or 1. For a frequency band greater than 3 GHz and less than or equal to 6 GHZ, n=0, 1, 2, or 3. Positions of the SS/PBCH block within a synchronization signal periodicity are obtained according to the foregoing formula by traversing the foregoing values of n. The rest can be deduced by analogy, and details are not described again.

For a subcarrier spacing of 30 kHz, the SS/PBCH block is sent according to {4, 8, 16, 20}+28*n. For a frequency band less than or equal to 3 GHZ, n=0. For a frequency band greater than 3 GHz and less than or equal to 6 GHZ, n=0 or 1.

For a subcarrier spacing of 30 kHz, the SS/PBCH block is sent according to {2, 8}+14*n. For a frequency band less than or equal to 3 GHZ, n=0 or 1. For a frequency band greater than 3 GHz and less than or equal to 6 GHZ, n=0, 1, 2, or 3.

For a subcarrier spacing of 120 kHz, the SS/PBCH block is sent according to {4, 8, 16, 20}+28*n. For a frequency band greater than 6 GHZ, n=0, 1, 2, 3, 5, 6, 7, 8, 10, 11, 12, 13, 15, 16, 17, or 18.

For a subcarrier spacing of 240 kHz, the SS/PBCH block is sent according to {8, 12, 16, 20, 32, 36, 40, 44}+56*n. For a frequency band greater than 6 GHZ, n=0, 1, 2, 3, 5, 6, 7, or 8.

It can be learned from the foregoing that the SS/PBCH block occupies only some symbols of some slots. Because the SIB1 is frequency division multiplexed with the SS/PBCH block, the time domain resource for sending the SS/PBCH block by the IAB node is also a time domain resource for sending the SIB1. In this case, the parent node may consider the time domain resource for sending the SS/PBCH block as the time domain resource for sending the SIB1 by the DU of the IAB node, and determine that an MT function of the IAB node is unavailable on the time domain resource. The time domain resource may be a symbol or a slot. This is not limited in this application.

Optionally, in another case shown in FIG. 6, a periodicity of actually sending the SIB1 by the DU of the IAB node may be 40 ms (twice the periodicity of the SS/PBCH block). For the parent node, a time domain resource for actually sending the PDCCH of the SIB1 by the DU of the IAB node may be determined based on time domain information of the SS/PBCH block and information about the periodicity of the SIB1. The periodicity of the SIB1 may be a periodicity of an absolute time. For example, the periodicity is 40 ms. Alternatively, the periodicity of the SIB1 may be a periodicity and an offset of a relative time. For example, a sending periodicity of the SIB1-PDCCH is twice the periodicity of the SS/PBCH block. For example, when the periodicity of the SS/PBCH block is 20 ms, the IAB node may use 2 to indicate the periodicity, and an obtained periodicity is 40 ms.

For example, as shown in FIG. 6, the parent node considers the time domain resource of the SS/PBCH block as the time domain resource for sending the SIB1 by the DU of the IAB node, and determines that the MT function of the IAB node is unavailable in the subframe.

It should be noted that, for the pattern 3, because a resource occupied by the SIB1 is always frequency division multiplexed with the SSB, even if no additional DU hard resource is required for the resource occupied by the SIB1, a larger periodicity used by the SIB1 does not reduce a DU hard resource.

(2) The multiplexing pattern between the SS/PBCH block and the SIB1 is the pattern 2.

Figure 7:
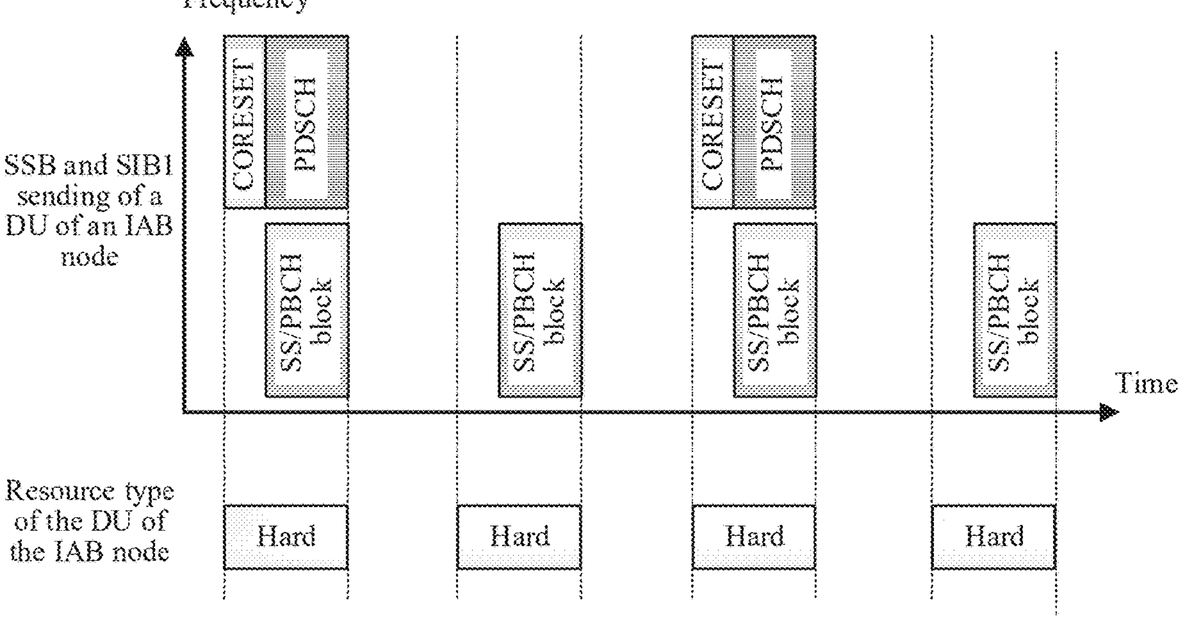
FIG. 7 is a schematic diagram of a pattern 2 according to an embodiment of this application.

As shown in FIG. 7, when a multiplexing pattern between an SS/PBCH block and a SIB1 is the pattern 2, and a PDCCH of the SIB1 is time division multiplexed with the SS/PBCH block, a parent node may first determine, based on configuration information of the SS/PBCH block and a CORESET of the PDCCH of the SIB1, a time domain position in which a DU of an IAB node may send the SIB1-PDCCH. Then, the parent node determines a time domain resource for actually sending the SIB1 by the DU of the IAB node based on an additional information indication.

The additional information indication may be information about a periodicity and an offset of the SIB1-PDCCH. For example, the periodicity and the offset may be a periodicity and an offset of an absolute time. For example, the periodicity is 40 ms, and the offset is 10 ms. Alternatively, the periodicity and the offset may be a periodicity and an offset of a relative time. For example, the sending periodicity of the SIB1-PDCCH is a multiple of a periodicity of an SS/PBCH block. For example, when the periodicity of the SS/PBCH block is 20 ms, the IAB node may use (4, 1) to indicate the periodicity and the offset, and an obtained periodicity and offset are (80 ms, 20 ms).

Further, the information used to indicate the periodicity and the offset of the SIB1-PDCCH may be sent by a donor node to the parent node, or may be sent by the IAB node to the parent node. If the information is sent by the donor node, there are two possibilities. A first possibility is that information about the periodicity is determined by the donor node and sent to the IAB node and the parent node. A second possibility is that information about the periodicity is determined by the IAB node and reported to the donor node, and then, the donor node notifies the parent node of the information about the periodicity.

Optionally, only the information about the periodicity may be configured, and a default offset is used. For example, the offset is 0 by default.

It should be noted that when the information indicating the periodicity and the offset of the SIB1-PDCCH is a multiple of the periodicity of the SS/PBCH block, the periodicity of the SS/PBCH block may be a periodicity configured based on an SS/PBCH block set (SS/PBCH burst set), or may be a periodicity configured based on the SS/PBCH block, or a periodicity configured based on an SS/PBCH block group.

The SS/PBCH block set represents all SS/PBCH blocks in a half-frame. When the periodicity and the offset are configured based on the SS/PBCH set, the parent node assumes that SIB1-PDCCHs corresponding to all SS/PBCH blocks of the DU of the IAB node have a same periodicity and offset.

When the periodicity is configured based on the SS/PBCH block, each SS/PBCH block may have an independent periodicity and offset. When the periodicity is configured based on the SS/PBCH block group, SS/PBCH blocks in one group have a same periodicity and offset, but SS/PBCH blocks in different groups have independent periodicities and offsets.

Another possible configuration is that an additional periodicity is configured based on the SS/PBCH block set or the SS/PBCH block group, and an additional offset is configured based on the SS/PBCH block group or the SS/PBCH block.

It should be noted that the parent node may obtain, through other signaling, an SS/PBCH block index of an actually transmitted AC-SSB of the IAB node, and SIBs 1 are in a one-to-one correspondence with SS/PBCH block indexes. Therefore, for an SS/PBCH block index for which an SS/PBCH block is not sent, the parent node may assume that the DU of the IAB node does not send a SIB1 corresponding to the SS/PBCH block index.

After obtaining an actual periodicity and offset of the SIB1-PDCCH, the parent node assumes that the DU of the IAB node uses the periodicity and the offset to send the SIB1-PDCCH. Usually, the DU of the IAB node may use the periodicity and offset to send the SIB1-PDCCH, but the DU of the IAB node may also use another periodicity and offset to send the SIB1-PDCCH. However, the DU of the IAB node should ensure that sending does not conflict with receiving and sending of an MT of the IAB node. That is, a resource position determined based on the periodicity and the offset is a resource position, assumed by the parent node, in which the DU of the IAB node sends the SIB1-PDCCH, and is not necessarily an actual resource position in which the DU of the IAB node sends the SIB1-PDCCH.

Figure 8:
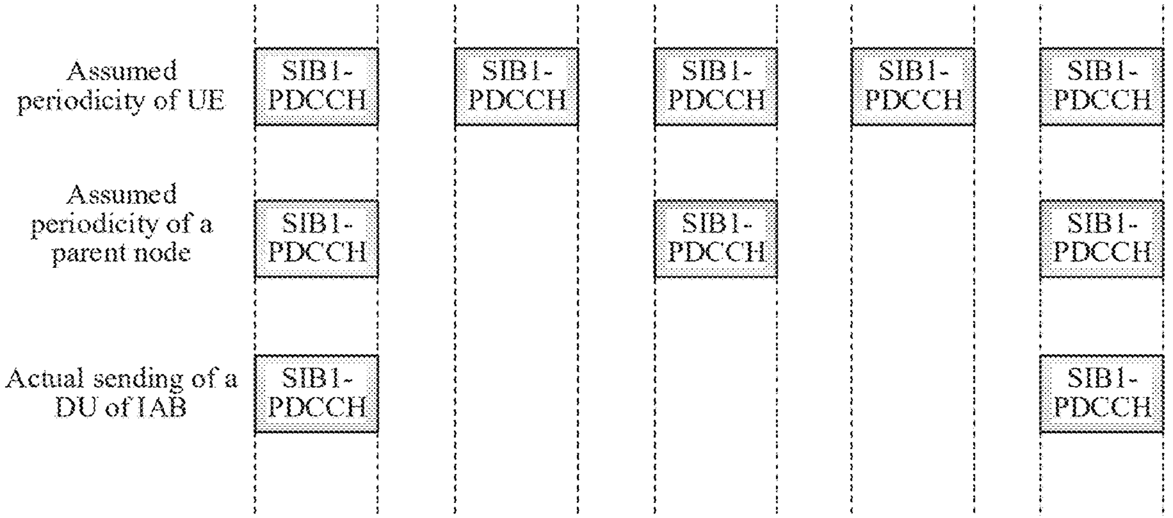
FIG. 8 is a schematic diagram of sending a SIB1 according to an embodiment of this application.

As shown in FIG. 8, a parent node determines, based on information about a time domain position, a periodicity, and an offset of a SIB1-PDCCH, that a time domain position in which a DU of an IAB node sends the SIB1-PDCCH is obtained when sending is performed once every 40 ms. However, a time domain position in which the DU of the IAB node actually sends the SIB1-PDCCH is obtained when sending is performed once every 80 ms (it is assumed that user equipment (UE) in FIG. 8 detects the SIB1-PDCCH once every 20 ms).

(3) The multiplexing pattern between the SS/PBCH block and the SIB1 is the pattern 1.

Figure 9:
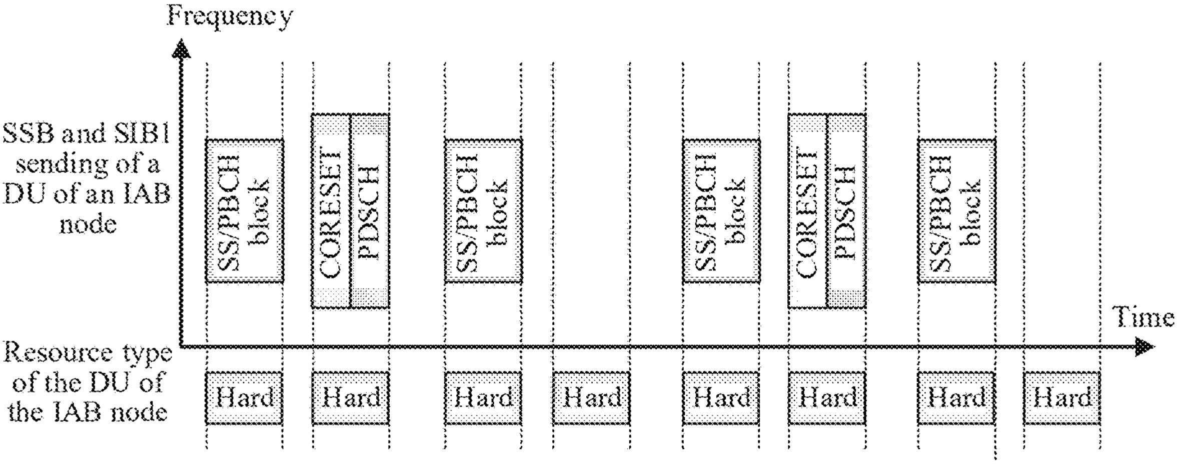
FIG. 9 is a schematic diagram of a pattern 1 according to an embodiment of this application.

As shown in FIG. 9, when a multiplexing pattern between an SS/PBCH block and a SIB1 is the pattern 1, both a SIB1-PDCCH and a SIB1-PDSCH are time division multiplexed with the SS/PBCH block.

There are some differences between the SIB1-PDCCH of the pattern 1 and the SIB1-PDCCH of the pattern 2.

First, a monitoring periodicity of the SIB1-PDCCH of the pattern 1 is 20 ms instead of a periodicity of the SS/PBCH block.

Second, for the pattern 1, after determining a slot number of the SIB1-PDCCH, a terminal device continuously performs PDCCH monitoring in two consecutive slots. However, during actual implementation, a DU of an IAB node may send the SIB1-PDCCH only in one of the slots. Therefore, the IAB node or a donor node may further send, to a parent node, information about a specific slot (for example, one of two consecutive slots) in which the DU of the IAB node sends the SIB1-PDCCH. After determining resources on which the DU of the IAB node sends the SIB1-PDCCH, the parent node considers these resources as hard resources of the DU of the IAB node, and correspondingly, considers these resources as unavailable resources of an MT function of the IAB node.

The following describes how the parent node obtains a time-frequency resource of a SIB1-PDSCH of the DU of the IAB node.

When a multiplexing pattern between an SS/PBCH block and a SIB1 is the pattern 2 or the pattern 3, a PDSCH is frequency division multiplexed with the SS/PBCH block. For a time domain resource of the PDSCH of the pattern 2 or the pattern 3, refer to a time domain resource of the SS/PBCH block. Therefore, the following considers only a case in which the multiplexing pattern is the pattern 1.

In the pattern 1, an actual transmission position of the SIB1-PDSCH is determined based on scheduling of the SIB1-PDCCH. In an ideal case, the DU of the IAB node may schedule the SIB1-PDSCH to a hard resource indicated in a resource configuration. However, in practice, a configured hard resource may be insufficient to send all SIB1-PDSCHs. In this case, an additional mechanism is required to ensure successful sending of the SIB1-PDSCHs.

A possible solution is that a particular constraint needs to be met when a hard/soft resource is configured. For example, a proportion of hard resources of the DU of the IAB node is not less than X % in a configured periodicity. A value of X may be defined in a protocol, or may be requested by the IAB node from the parent node or the donor node.

Another possible solution is that the IAB node or the donor node notifies the parent node of time domain information for scheduling the SIB1-PDSCH by the IAB node. For example, the IAB node may report, to the parent node, a time domain parameter for scheduling the SIB1-PDSCH by using the SIB1-PDCCH, that is, time domain resource assignment in a downlink control channel (DCI). After obtaining the time domain information of the SIB1-PDSCH, the parent node may determine an additional hard resource of the DU of the IAB node.

Figures 10, 11:
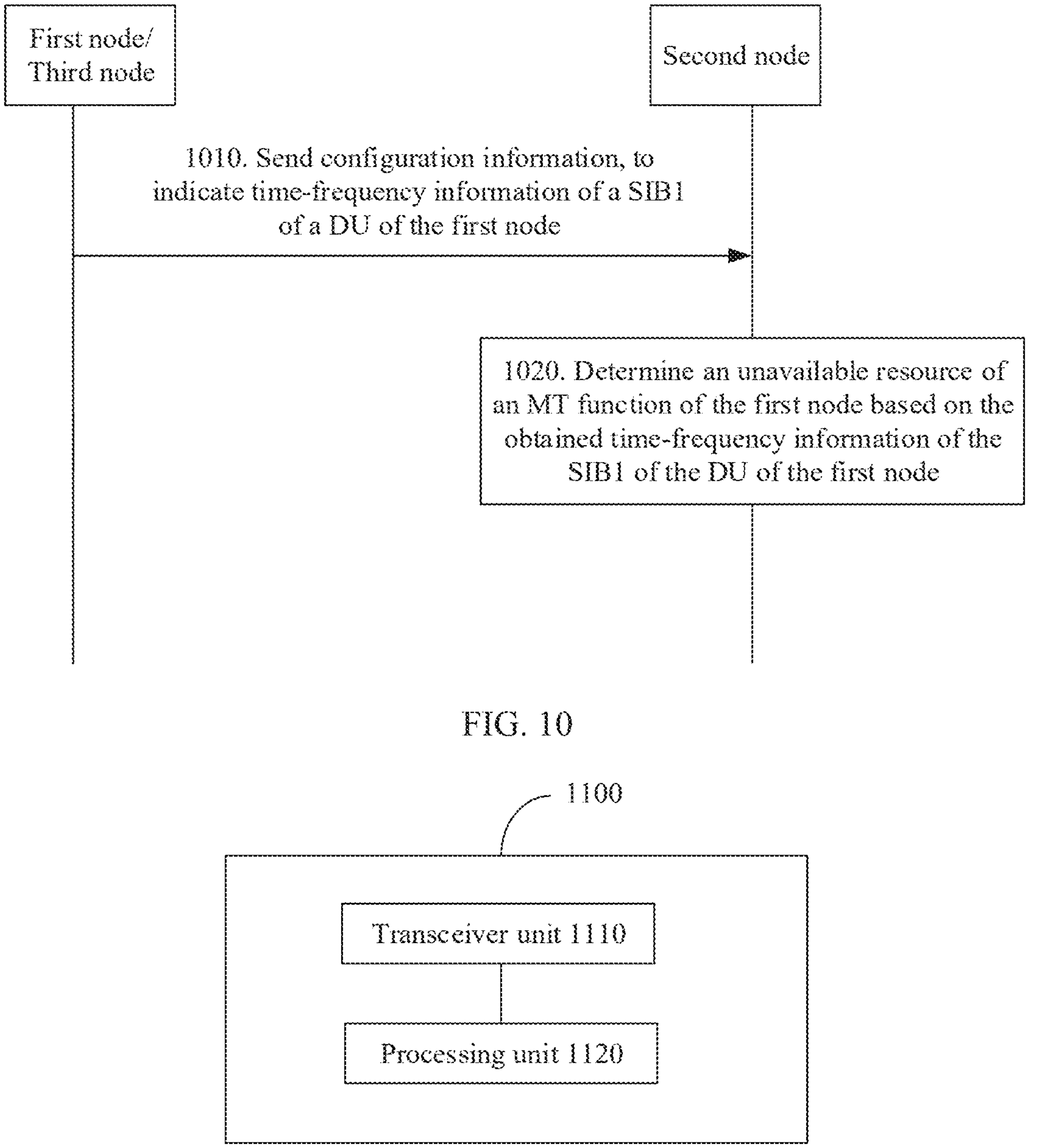
FIG. 10 is a schematic diagram of interaction in a communication method according to an embodiment of this application.
FIG. 11 is a schematic diagram of a possible structure of a node according to an embodiment of this application.

Based on the foregoing analysis of the three multiplexing patterns, as shown in FIG. 10, an embodiment of this application provides a communication method 1000, including the following steps.

1010. Receive configuration information from a first node or a third node, where the configuration information indicates time-frequency information of a system information block 1 SIB1 of a distributed unit DU of the first node.

1020. Determine, based on the obtained time-frequency information of the SIB1 of the DU of the first node, an unavailable resource of a mobile termination MT function of the first node.

The first node is an integrated access and backhaul IAB node, a second node is a parent node of the first node, and the third node is a donor node.

In this embodiment of this application, a time domain resource of the SIB1 is obtained based on a time domain resource of an SS/PBCH block, and compared with directly reporting the time domain resource of the SIB1, signaling overheads are reduced more.

Specifically, the configuration information includes time-frequency information of the SS/PBCH block, and time domain information of the SS/PBCH block includes a sending periodicity and an offset of the SS/PBCH block, an index of the SS/PBCH block, and frequency domain information of the SS/PBCH block.

There may be a plurality of implementations for obtaining, based on the time-frequency information of the SS/PBCH block, time domain information that may be used to send the SIB1. For example, in an implementation, the donor node or the IAB node sends a CORESET configuration of a PDCCH of the SIB1 to the parent node. In this case, the configuration information includes the CORESET configuration and search space occupied by the PDCCH of the SIB1, and the CORESET configuration includes one or more of the following information:

information about a multiplexing pattern between the SS/PBCH block and the SIB1, frequency domain information of the SIB1, and a frequency domain offset of the SIB1.

That is, the IAB node or the donor node directly sends the CORESET configuration of the SIB1-PDCCH to the parent node, so that the parent node can obtain the frequency domain information of the SIB1 and the information about the multiplexing pattern between the SIB1 and the SS/PBCH block, thereby obtaining time-frequency domain information of the SIB1. The CORESET configuration of the SIB1-PDCCH is encapsulated in a master information block (main system information, MIB) for sending, and a corresponding parameter is pdcch-ConfigSIB1. For example, the parent node obtains the configuration information of the SIB1-PDCCH (pdcch-ConfigSIB1 and a subcarrier spacing of the SIB1-PDCCH) by using the MIB. CORESET information (including a multiplexing pattern (pattern 1, 2, or 3), a quantity of RBs occupied by the CORESET, and a quantity of symbols occupied by the CORESET) and monitoring occasion information (or search space information) of the SIB1-PDCCH may be separately determined based on the configuration information. The monitoring occasion information includes a frame position, a slot position, and a symbol position that are occupied by a SIB1-PDCCH monitoring occasion corresponding to each SSB.

In another implementation, the donor node or the IAB node does not need to send the CORESET configuration of the PDCCH of the SIB1 to the IAB node, but looks up a table stored by the second node based on information such as a subcarrier spacing, an index, and a minimum channel bandwidth, to obtain a specific CORESET configuration of the PDCCH of the SIB1. For example, the second node stores one or more tables, and each of the one or more tables records the following information:

an index, a multiplexing pattern between the SS/PBCH block and the SIB1, frequency domain information of the SIB1, and a frequency domain offset of the SIB1.

The configuration information further includes a subcarrier spacing of the SS/PBCH block and a subcarrier spacing of the SIB1 (which may also be referred to as a subcarrier spacing of the PDCCH for scheduling the SIB1, or referred to as a subcarrier spacing of the search space and the CORESET for scheduling the SIB1).

The configuration information further includes a minimum channel bandwidth occupied by the DU of the first node.

The second node determines a first table in the one or more tables based on the subcarrier spacing of the SIB1 and the subcarrier spacing of the SS/PBCH block and/or the minimum channel bandwidth occupied by the DU of the first node.

The second node receives a first index, where the first index indicates a CORESET configuration occupied by the PDCCH of the SIB1.

The CORESET configuration occupied by the PDCCH of the SIB1 is determined in the first table based on the first index.

In this manner, the CORESET configuration of the SIB1 is obtained based on a table storing the CORESET configuration of the SIB1 and the index information, which reduces signaling overheads compared with directly sending the CORESET configuration of the SIB1.

For example, it can be learned from Table 13-1 to Table 13-11 that when subcarrier spacings of SS/PBCH blocks are the same, different minimum channel bandwidths correspond to different tables. Therefore, the parent node further needs to learn of the minimum channel bandwidth occupied by the DU of the first node, where a value of the minimum channel bandwidth is 5 MHz, 10 MHz, or 40 MHz.

Further, the second node prestores one or more tables, where each of the one or more tables records a configuration index, the frequency domain information of the SIB1, and the information about the multiplexing pattern between the SS/PBCH block and the SIB1; determines the frequency domain information of the SIB1 and the information about the multiplexing pattern between the SIB1 and the SS/PBCH block based on a configuration index received from the donor node or the IAB node and the one or more tables; and obtains the time domain information of the SIB1 based on the time domain information of the SS/PBCH block and the information about the multiplexing pattern between the SIB1 and the SS/PBCH block.

For example, the second node may prestore the following tables, namely, Table 13-1 to Table 13-11 (where the following tables are merely examples, and values in a table stored during actual implementation may be different from those enumerated in this embodiment), and obtain a time domain position of the SIB1 based on the prestored tables and the obtained configuration information of the SIB1-PDCCH.

For example, when the subcarrier spacing of the SS/PBCH block is 120 kHz, and the subcarrier spacing of the SIB1 is 120 kHz, corresponding to Table 13-8, when an index is 4, the second node may obtain that a multiplexing pattern between the SS/PBCH block and the SIB1 is 3, and the frequency domain information of the SIB1 includes a quantity 24 of RBs in the SIB1, a quantity 2 of symbols in the SIB1, and an RB offset −20 or −21. Because the multiplexing pattern between the SS/PBCH block and the SIB1 is 3, both the PDCCH and a PDSCH of the SIB1 are frequency division multiplexed with the SS/PBCH block. In this case, a terminal device may obtain the time domain position of the SIB1 based on a time domain position of the SS/PBCH block. For obtaining of information about the time domain position of the SS/PBCH block, refer to the foregoing descriptions. Details are not described herein again.

For example, when the subcarrier spacing of the SS/PBCH block is 120 kHz and the subcarrier spacing of the SIB1 is 60 kHz, corresponding to Table 13-7, when an index is 8, the second node may obtain that a multiplexing pattern between the SS/PBCH block and the SIB1 is 2, and the frequency domain information of the SIB1 includes a quantity 48 of RBs in the SIB1, a quantity 1 of symbols in the SIB1, and an RB offset −41 or −42. Because the multiplexing pattern between the SS/PBCH block and the SIB1 is 2, the PDCCH of the SIB1 is time division multiplexed and frequency division multiplexed with the SS/PBCH block, and a PDSCH of the SIB1 is frequency division multiplexed with the SS/PBCH block (refer to the pattern 2 in FIG. 5). In this case, a terminal device may obtain a time domain position of the PDSCH of the SIB1 based on a time domain position of the SS/PBCH block. For obtaining of information about the time domain position of the SS/PBCH block, refer to the foregoing descriptions. Details are not described herein again. The time domain position of the SIB1-PDCCH further needs to be indicated, for example, by indicating a sending periodicity of the SIB1-PDCCH and an offset relative to the SS/PBCH block. FIG. 8 is used as an example. A sending periodicity of a PDCCH of a SIB1 is twice a periodicity of an SS/PBCH block, and an offset may be a quantity of offset slots or a quantity of offset OFDM symbols in time domain.

For another example, when the subcarrier spacing of the SS/PBCH block is 15 kHz, the subcarrier spacing of the CORESET is 15 kHz, and the minimum channel bandwidth is 5 MHz or 10 MHz, corresponding to Table 13-1, when an index is 0, the second node may obtain that a multiplexing pattern between the SS/PBCH block and the SIB1 is 1, and the frequency domain information of the SIB1 includes a quantity 24 of RBs, a quantity 2 of symbols, and a frequency domain offset of 2 RBs. Because the multiplexing pattern between the SS/PBCH block and the SIB1 is 1, the PDCCH and a PDSCH of the SIB1 are time division multiplexed with the SS/PBCH block. In this case, the second node may determine a time domain position of the SIB1 based on a time domain position of the SS/PBCH block and an offset of the SIB1 relative to the SS/PBCH block. For obtaining of information about the time domain position of the SS/PBCH block, refer to the foregoing descriptions. Details are not described herein again.

Because the pattern 1 is particular, for the pattern 1, after determining a slot number of the SIB1-PDCCH, the terminal device continuously performs PDCCH monitoring in two consecutive slots. However, during actual implementation, the DU of the IAB node may send the SIB1-PDCCH in only one of the slots. Therefore, the IAB node or the parent node may further send, to the parent node, a specific slot in which the IAB node or the parent node sends the SIB1-PDCCH.

TABLE 13-1

Set of resource blocks and slot symbols of CORESET for Type0-PDCCH search space set when {SS/PBCH block, PDCCH} SCS is {15, 15} kHz for frequency bands with minimum channel bandwidth 5 MHz or 10 MHZ

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

TABLE 13-2

Set of resource blocks and slot symbols of CORESET for Type0-PDCCH search space set when {SS/PBCH block, PDCCH} SCS is {15, 30} kHz for frequency bands with minimum channel bandwidth 5 MHz or 10 MHZ

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 24 | 2 | 5 |
| 1 | 1 | 24 | 2 | 6 |
| 2 | 1 | 24 | 2 | 7 |
| 3 | 1 | 24 | 2 | 8 |
| 4 | 1 | 24 | 3 | 5 |
| 5 | 1 | 24 | 3 | 6 |
| 6 | 1 | 24 | 3 | 7 |
| 7 | 1 | 24 | 3 | 8 |
| 8 | 1 | 48 | 1 | 18 |
| 9 | 1 | 48 | 1 | 20 |
| 10 | 1 | 48 | 2 | 18 |
| 11 | 1 | 48 | 2 | 20 |
| 12 | 1 | 48 | 3 | 18 |
| 13 | 1 | 48 | 3 | 20 |
| 14 | | Reserved | | |
| 15 | | Reserved | | |

TABLE 13-3

Set of resource blocks and slot symbols of CORESET for Type0-PDCCH search space set when {SS/PBCH block, PDCCH} SCS is {30, 15} kHz for frequency bands with minimum channel bandwidth 5 MHz or 10 MHZ

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 48 | 1 | 2 |
| 1 | 1 | 48 | 1 | 6 |
| 2 | 1 | 48 | 2 | 2 |
| 3 | 1 | 48 | 2 | 6 |
| 4 | 1 | 48 | 3 | 2 |
| 5 | 1 | 48 | 3 | 6 |
| 6 | 1 | 96 | 1 | 28 |
| 7 | 1 | 96 | 2 | 28 |
| 8 | 1 | 96 | 3 | 28 |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

TABLE 13-4

Set of resource blocks and slot symbols of CORESET for Type0-PDCCH search space set when {SS/PBCH block, PDCCH} SCS is {30, 30} kHz for frequency bands with minimum channel bandwidth 5 MHz or 10 MHZ

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 24 | 2 | 0 |
| 1 | 1 | 24 | 2 | 1 |

TABLE 13-4-continued

Set of resource blocks and slot symbols of CORESET for Type0-PDCCH search space set when {SS/PBCH block, PDCCH} SCS is {30, 30} kHz for frequency bands with minimum channel bandwidth 5 MHz or 10 MHZ

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 12 |
| 11 | 1 | 48 | 1 | 14 |
| 12 | 1 | 48 | 1 | 16 |
| 13 | 1 | 48 | 2 | 12 |
| 14 | 1 | 48 | 2 | 14 |
| 15 | 1 | 48 | 2 | 16 |

TABLE 13-5

Set of resource blocks and slot symbols of CORESET for Type0-PDCCH search space set when {SS/PBCH block, PDCCH} SCS is {30, 15} kHz for frequency bands with minimum channel bandwidth 40 MHZ

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 48 | 1 | 4 |
| 1 | 1 | 48 | 2 | 4 |
| 2 | 1 | 48 | 3 | 4 |
| 3 | 1 | 96 | 1 | 0 |
| 4 | 1 | 96 | 1 | 56 |
| 5 | 1 | 96 | 2 | 0 |
| 6 | 1 | 96 | 2 | 56 |
| 7 | 1 | 96 | 3 | 0 |
| 8 | 1 | 96 | 3 | 56 |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

TABLE 13-6

Set of resource blocks and slot symbols of CORESET for Type0-PDCCH search space set when {SS/PBCH block, PDCCH} SCS is {30, 30} kHz for frequency bands with minimum channel bandwidth 40 MHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |

TABLE 13-6-continued

Set of resource blocks and slot symbols of CORESET for Type0-PDCCH search space set when {SS/PBCH block, PDCCH} SCS is {30, 30} kHz for frequency bands with minimum channel bandwidth 40 MHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 4 | 1 | 48 | 1 | 0 |
| 5 | 1 | 48 | 1 | 28 |
| 6 | 1 | 48 | 2 | 0 |
| 7 | 1 | 48 | 2 | 28 |
| 8 | 1 | 48 | 3 | 0 |
| 9 | 1 | 48 | 3 | 28 |
| 10 | | Reserved | | |
| 11 | | Reserved | | |
| 12 | | Reserved | | |
| 13 | | Reserved | | |
| 14 | | Reserved | | |
| 15 | | Reserved | | |

TABLE 13-7

Set of resource blocks and slot symbols of CORESET for Type0-PDCCH search space set when {SS/PBCH block, PDCCH} SCS is {120, 60} kHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |
| 6 | 1 | 96 | 1 | 28 |
| 7 | 1 | 96 | 2 | 28 |
| 8 | 2 | 48 | 1 | −41 if $k_{SSB} = 0$<br>−42 if $k_{SSB} > 0$ |
| 9 | 2 | 48 | 1 | 49 |
| 10 | 2 | 96 | 1 | −41 if $k_{SSB} = 0$<br>−42 if $k_{SSB} > 0$ |
| 11 | 2 | 96 | 1 | 97 |
| 12 | | Reserved | | |
| 13 | | Reserved | | |
| 14 | | Reserved | | |
| 15 | | Reserved | | |

TABLE 13-8

Set of resource blocks and slot symbols of CORESET for Type0-PDCCH search space set when {SS/PBCH block, PDCCH} SCS is {120, 120} kHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if $k_{SSB} = 0$<br>−21 if $k_{SSB} > 0$ |

TABLE 13-8-continued

Set of resource blocks and slot symbols of CORESET for Type0-PDCCH search space set when {SS/PBCH block, PDCCH} SCS is {120, 120} kHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 5 | 3 | 24 | 2 | 24 |
| 6 | 3 | 48 | 2 | −20 if $k_{SSB} = 0$<br>−21 if $k_{SSB} > 0$ |
| 7 | 3 | 48 | 2 | 48 |
| 8 | | Reserved | | |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

TABLE 13-9

Set of resource blocks and slot symbols of CORESET for Type0-PDCCH search space set when {SS/PBCH block, PDCCH} SCS is {240, 60} kHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 96 | 1 | 0 |
| 1 | 1 | 96 | 1 | 16 |
| 2 | 1 | 96 | 2 | 0 |
| 3 | 1 | 96 | 2 | 16 |
| 4 | | Reserved | | |
| 5 | | Reserved | | |
| 6 | | Reserved | | |
| 7 | | Reserved | | |
| 8 | | Reserved | | |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

TABLE 13-10

Set of resource blocks and slot symbols of CORESET for Type0-PDCCH search space set when {SS/PBCH block, PDCCH} SCS is {240, 120} kHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | −41 if $k_{SSB} = 0$<br>−42 if $k_{SSB} > 0$ |
| 5 | 2 | 24 | 1 | 25 |
| 6 | 2 | 48 | 1 | −41 if $k_{SSB} = 0$<br>−42 if $k_{SSB} > 0$ |

TABLE 13-10-continued

Set of resource blocks and slot symbols of CORESET for Type0-PDCCH search space set when {SS/PBCH block, PDCCH} SCS is {240, 120} kHz

| Index | SS/PBCH block and CORESET multiplexing pattern | Number of RBs $N_{RB}^{CORESET}$ | Number of symbols $N_{symb}^{CORESET}$ | Offset (RBs) |
|---|---|---|---|---|
| 7 | 2 | 48 | 1 | 49 |
| 8 | | Reserved | | |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

The parent node obtains a time-frequency resource on which the DU of the IAB node may send the SIB1, and further needs to obtain a time-frequency resource on which the DU of the IAB node actually sends the SIB1.

To obtain the time-frequency resource on which the DU of the IAB node actually sends the SIB1, a further information indication is required. The information indication may be information about a periodicity and an offset of the SIB1-PDCCH (where the offset is not necessary, and only the periodicity of the SIB1-PDCCH may be indicated). For example, the periodicity and the offset may be a periodicity and an offset of an absolute time. For example, the periodicity is 40 ms, and the offset is 10 ms. Alternatively, the periodicity and the offset may be a periodicity and an offset of a relative time. For example, the sending periodicity of the SIB1-PDCCH is a multiple of the periodicity of the SS/PBCH block. For example, when the periodicity of the SS/PBCH block is 20 ms, the IAB node may use (4, 1) to indicate the periodicity and the offset, and an obtained periodicity and offset are (80 ms, 20 ms).

Further, the information used to indicate the periodicity and the offset of the SIB1-PDCCH may be sent by the donor node to the parent node, or may be sent by the IAB node to the parent node. If the information is sent by the donor node, there are two possibilities. A first possibility is that information about the periodicity is determined by the donor node and sent to the IAB node and the parent node. A second possibility is that information about the periodicity is determined by the IAB node and reported to the donor node, and then, the donor node notifies the parent node of the information about the periodicity.

Optionally, only the information about the periodicity may be configured, and a default offset is used. For example, the offset is 0 by default.

In conclusion, the parent node obtains the time domain resource of the SIB1 of the DU of the IAB node, and correspondingly considers the time domain resource as an unavailable resource of the MT of the IAB node, that is, the parent node does not send a downlink signal to the MT of the IAB node on the time domain resource, to avoid a resource conflict.

The embodiments described in this specification may be independent solutions, or may be combined according to internal logic. All these solutions fall within the protection scope of this application.

It may be understood that, in the foregoing method embodiment, the method and operations that are implemented by the IAB node or the parent node may also be implemented by a component (for example, a chip or a circuit) that can be used in the IAB node or the parent node.

The foregoing describes the method embodiment provided in the embodiments of this application, and the following describes apparatus embodiments provided in the embodiments of this application. It should be understood that descriptions of the apparatus embodiments correspond to the descriptions of the method embodiment. Therefore, for content that is not described in detail, refer to the foregoing method embodiment. For brevity, details are not described herein again.

The foregoing mainly describes the solutions provided in the embodiments of this application from a perspective of interaction between network elements. It may be understood that, to implement the foregoing functions, the network elements, for example, the first node and the second node, include corresponding hardware structures and/or software modules for performing the functions. A person skilled in the art should be easily aware that, in combination with the network elements and algorithm steps in the examples described in the embodiments disclosed in this specification, this application may be implemented by using hardware or a combination of hardware and computer software. Whether the functions are performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, each of the first node and the second node may be divided into functional modules based on the foregoing method examples. For example, each of the first node and the second node may be divided into functional modules, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used. It should be understood that the second node may be an IAB node, or may be a donor node.

FIG. 11 is a schematic diagram of a possible structure of a node 1100 related to the foregoing embodiments according to this application. The node 1100 includes a transceiver unit 1110 and a processing unit 1120. The transceiver unit 1110 may communicate with the outside, and the processing unit 1120 is configured to process data. The transceiver unit 1110 may also be referred to as a communications interface or a communications unit.

The node 1100 may be configured to perform actions performed by the IAB node in the foregoing method embodiment, or may perform actions performed by the parent node of the IAB node in the foregoing method embodiment.

In an implementation, the transceiver unit 1110 is configured to perform operations related to receiving and sending of the IAB node or the parent node. The processing unit 1120 is configured to perform operations related to data processing of the IAB node or the parent node.

In an embodiment, the transceiver unit 1110 is configured to receive configuration information from a first node or a third node, where the configuration information indicates time-frequency information of a system information block 1

SIB1 of a distributed unit DU of the first node; the processing unit 1120 is configured to determine, based on the obtained time-frequency information of the SIB1 of the DU of the first node, an unavailable resource of a mobile termination MT function of the first node.

In another embodiment, the transceiver unit 1110 is configured to report configuration information to a second node, where the configuration information indicates time-frequency information of a SIB1. The first node is an integrated access and backhaul IAB node, and the second node is a parent node of the first node. The processing unit 1120 is configured to determine the time-frequency information of the system information block 1 SIB1 of a distributed unit DU.

The configuration information may include time domain information of an SS/PBCH block, and the time domain information of the synchronization signal/physical broadcast channel SS/PBCH block includes a periodicity and an offset of the SS/PBCH block.

Optionally, the configuration information further includes a CORESET configuration and search space occupied by a PDCCH of the SIB1, and the CORESET configuration includes one or more of the following information:

information about a multiplexing pattern between the SS/PBCH block and the SIB1, frequency domain information of the SIB1, and a frequency domain offset of the SIB1.

Optionally, the node further includes a storage unit, configured to store one or more tables, where each of the one or more tables records the following information:

an index, a multiplexing pattern between the SS/PBCH block and the SIB1, frequency domain information of the SIB1, and a frequency domain offset of the SIB1.

Optionally, the transceiver unit is further configured to receive a subcarrier spacing of the SIB1, a subcarrier spacing of the SS/PBCH block, and a first index, where the first index indicates a CORESET configuration occupied by a PDCCH of the SIB1.

The processing unit is further configured to: determine a first table in the one or more tables based on the subcarrier spacing of the SIB1 and the subcarrier spacing of the SS/PBCH block; and determine, in the first table based on the first index, the CORESET configuration occupied by the PDCCH of the SIB1.

Optionally, the configuration information further includes a subcarrier spacing of the SS/PBCH block and a subcarrier spacing of the SIB1.

Optionally, the configuration information further includes a minimum channel bandwidth occupied by the DU of the first node.

Optionally, the configuration information further includes information indicating a periodicity of the SIB1 and information indicating an offset of the SIB1.

Further, the transceiver unit 1110 is further configured to send or receive the configuration information by using radio resource control RRC signaling or an interface message F1-AP.

Further, the transceiver unit 1110 is further configured to report, to the second node, a time domain parameter of a physical downlink shared channel PDSCH for scheduling the SIB1 by the DU. The time domain parameter includes time domain resource assignment time domain resource assignment in downlink control information.

It should be understood that the processing unit 1120 in the foregoing embodiment may be implemented by a processor or a processor-related circuit, and the transceiver unit 1110 may be implemented by a transceiver or a transceiver-related circuit.

Figure 12:
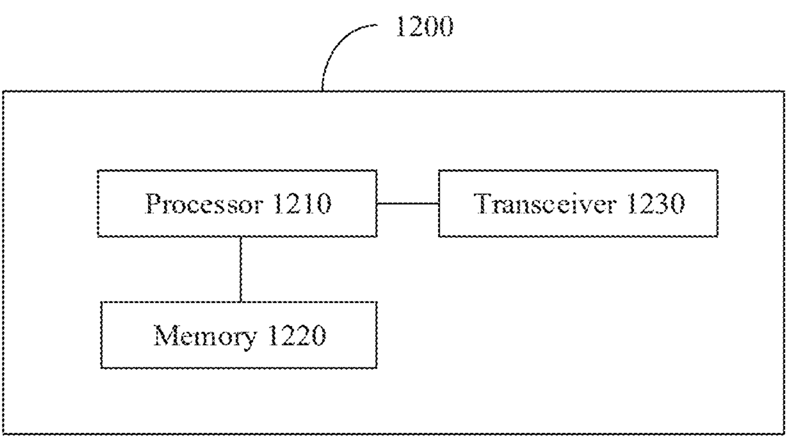
FIG. 12 is a schematic diagram of a possible logical structure of a node according to an embodiment of this application.

As shown in FIG. 12, an embodiment of this application further provides a communications apparatus 1200. The communications apparatus 1200 includes a processor 1210, a memory 1220, and a transceiver 1230. The memory 1210 stores a program. The processor 1210 is configured to execute the program stored in the memory 1220. The program stored in the memory 1220 is executed, so that the processor 1210 is configured to perform related processing steps in the foregoing method embodiment, and the program stored in the memory 1220 is executed, so that the processor 1210 controls the transceiver 1230 to perform related sending and receiving steps in the foregoing method embodiment.

In an implementation, the communications apparatus 1200 is configured to perform actions performed by the first node, the second node, or the third node in the foregoing method embodiment. In this case, the program stored in the memory 1220 is executed, so that the processor 1210 is configured to perform processing steps on a side of the first node, the second node, or the third node in the foregoing method embodiment, and the program stored in the memory 1220 is executed, so that the processor 1210 controls the transceiver 1230 to perform receiving and sending steps on the side of the first node, the second node, or the third node in the foregoing method embodiment.

When the communications apparatus 1200 is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a communications system. The communications system includes the donor node, the IAB node, and the parent node of the IAB node in the foregoing embodiments.

An embodiment of this application further provides a computer-readable storage medium. The computer-readable storage medium stores a computer program. When the computer program is executed by a computer, the computer is enabled to implement the method on a terminal device side or the method on a positioning management device side in the foregoing method embodiment.

An embodiment of this application further provides a computer program product including instructions. When the instructions are executed by a computer, the computer is enabled to implement the method on a terminal device side or the method on a positioning management device side in the foregoing method embodiment.

For explanations and beneficial effects of related content of any of the communications apparatuses provided above, refer to the corresponding method embodiment provided above, and details are not described herein again.

The node in the embodiments of this application includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, contacts, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain, and/or carry instructions and/or data.

It should be understood that, the processor mentioned in the embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, discrete gate or transistor logic device, or discrete hardware component, the memory (storage module) is integrated into the processor.

It should be noted that the memory described in this specification aims to include but is not limited to these memories and any memory of another appropriate type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiment, and details are not described herein again.

In the several embodiments provided in this application, it should be understood that the disclosed system, apparatus, and method may be implemented in other manners. For example, the described apparatus embodiments are merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium such as a USB flash drive, a removable hard disk, a read-only memory (ROM), a random access memory (RAM), a magnetic disk, or an optical disc, that can store program code.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method carried out by a second node, the method comprising:

receiving configuration information provided by a donor base station node incorporating a central unit and distributed unit (CU-DU) pair, wherein the configuration information indicates time-frequency information of a system information block 1 (SIB1) of a distributed unit (DU) function of a first node that is a child integrated access and backhaul (IAB) node, and wherein the second node is a parent IAB node of the first node; and determining, based on the time-frequency information of the SIB1 of the DU function of the first node, an unavailable resource of a mobile termination (MT) function of the first node, wherein the configuration information comprises time-frequency information of a synchronization signal/physical broadcast channel (SS/PBCH) block, and wherein the determining comprises:

determining, based on the time-frequency information of the SS/PBCH block of a DU of the first node, a time-frequency resource for sending the SIB1 by the DU of the first node; and determining the time-frequency resource for sending the SIB1 by the DU of the first node as the unavailable resource of the MT function of the first node.

2. The method according to claim 1, wherein the time-frequency information of the SS/PBCH block comprises one or more of the following information:

a periodicity and an offset of the SS/PBCH block, an index of the SS/PBCH block in a half-frame, a subcarrier spacing of the SS/PBCH block, and frequency domain information of the SS/PBCH block.

3. The method according to claim 1, wherein the configuration information further comprises one or more of the following information:

information about a multiplexing pattern between the SS/PBCH block and the SIB1, frequency domain information of the SIB1, and a frequency domain offset of the SIB1.

4. The method according to claim 1, wherein the second node stores one or more tables, and each of the one or more tables records the following information:

an index, a multiplexing pattern between the SS/PBCH block and the SIB1, frequency domain information of the SIB1, and a frequency domain offset of the SIB1.

5. The method according to claim 4, further comprising:

obtaining, by the second node, a subcarrier spacing of the SIB1 and the subcarrier spacing of the SS/PBCH block;

determining a first table in the one or more tables based on the subcarrier spacing of the SIB1 and the subcarrier spacing of the SS/PBCH block;

receiving, by the second node, a first index, wherein the first index indicates a CORESET configuration occupied by a physical downlink control channel (PDCCH) of the SIB1; and determining, in the first table based on the first index, the CORESET configuration occupied by the PDCCH of the SIB1.

6. The method according to claim 1, wherein the determining the unavailable resource of the MT function of the first node further comprises:

determining a time-frequency resource occupied by the SIB1 of the DU function of the first node as the unavailable resource of the MT function of the first node.

7. The method according to claim 1, wherein the configuration information is received by using an interface message F1-AP.

8. A second node comprising:

a processor; and a transceiver, wherein the processor and transceiver are configured to cooperatively operate to carry out a communications method comprising:

receiving configuration information provided by a donor base station node incorporating a central unit and distributed unit (CU-DU) pair, wherein the configuration information indicates time-frequency information of a system information block 1 (SIB1) of a distributed unit (DU) function of a first node that is a child integrated access and backhaul (IAB) node, and wherein the second node is a parent IAB node of the first node; and determining, based on the time-frequency information of the SIB1 of the DU function of the first node, an unavailable resource of a mobile termination (MT) function of the first node, wherein the configuration information comprises time-frequency information of a synchronization signal/physical broadcast channel (SS/PBCH) block, and wherein the determining comprises:

determining, based on the time-frequency information of the SS/PBCH block of a DU of the first node, a time-frequency resource for sending the SIB1 by the DU of the first node; and determining the time-frequency resource for sending the SIB1 by the DU of the first node as the unavailable resource of the MT function of the first node.

9. The node according to claim 8, wherein the time domain information of the SS/PBCH block comprises a periodicity and an offset of the SS/PBCH block.

10. The node according to claim 8, wherein the configuration information further comprises one or more of the following information:

information about a multiplexing pattern between the SS/PBCH block and the SIB1, frequency domain information of the SIB1, and a frequency domain offset of the SIB1.

11. The node according to claim 8, further comprising a storage, configured to store one or more tables, and each of the one or more tables records the following information:

an index, a multiplexing pattern between the SS/PBCH block and the SIB1, frequency domain information of the SIB1, and a frequency domain offset of the SIB1.

12. The node according to claim 8, wherein the transceiver is further configured to cooperate with the processor to: obtain a subcarrier spacing of the SIB1 and a subcarrier spacing of the SS/PBCH block; and receive a first index, wherein the first index indicates a CORESET configuration occupied by a physical downlink control channel (PDCCH) of the SIB1; and the processor is further configured to: determine a first table in the one or more tables based on the subcarrier spacing of the SIB1 and the subcarrier spacing of the SS/PBCH block; and determine, in the first table based on the first index, the CORESET configuration occupied by the PDCCH of the SIB1.

13. The node according to claim 8, wherein the processor is configured to determine a time-frequency resource occupied by the SIB1 of the DU function of the first node as the unavailable resource of the MT function of the first node.

14. The node according to claim 8, wherein the transceiver is configured to cooperate with the processor to receive the configuration information by using an interface message F1-AP.

15. A first node comprising:

a processor, configured to determine time-frequency information of a system information block 1 (SIB1) of a distributed unit (DU) function of child integrated access and backhaul (IAB) node; and a transceiver, configured to cooperate with the processor to send configuration information to a second node, wherein the configuration information indicates the time-frequency information of the SIB1, wherein the first node is a donor base station node, and the second node is a parent IAB node of the child IAB node, and wherein the donor base station node incorporates a central unit and distributed unit (CU-DU) pair, wherein the second node, based on the time-frequency information of the SIB1 of the DU function of the first node, performs determining an unavailable resource of a mobile terminal (MT) function of the first node, wherein the configuration information comprises time-frequency information of a synchronization signal/physical broadcast channel (SS/PBCH) block, and wherein the determining comprises:

determining, based on the time-frequency information of the SS/PBCH block of a DU of the first node, a time-frequency resource for sending the SIB1 by the DU of the first node; and determining the time-frequency resource for sending the SIB1 by the DU of the first node as the unavailable resource of the MT function of the first node.

16. The first node according to claim 15, wherein the time domain information of the SS/PBCH block comprises a periodicity and an offset of the SS/PBCH block.

17. The first node according to claim 15, wherein the configuration information further comprises one or more of the following information:

information about a multiplexing pattern between the SS/PBCH block and the SIB1, frequency domain information of the SIB1, and a frequency domain offset of the SIB1.

* * * * *